United States Patent [19]
Fujioka et al.

[11] Patent Number: 6,086,165
[45] Date of Patent: Jul. 11, 2000

[54] SOLENOID CONTROLLED VALVE AND ANTILOCK CONTROL APPARATUS USING THE SAME

[75] Inventors: Hideaki Fujioka; Kazumi Yasuzumi; Koichi Hashida, all of Itami; Takato Ohgaki, Ashiya, all of Japan

[73] Assignee: Sumitomo Electric Industries, Ltd., Osaka, Japan

[21] Appl. No.: 09/041,001

[22] Filed: Mar. 12, 1998

[30] Foreign Application Priority Data

Mar. 14, 1997 [JP] Japan .................................. 9-060558
Sep. 19, 1997 [JP] Japan .................................. 9-255280

[51] Int. Cl.[7] ............................................. B60T 8/36
[52] U.S. Cl. ............................ 303/119.2; 303/117.1; 303/119.1; 137/596.16
[58] Field of Search .......................... 303/119.1, 119.2, 303/117.1, 115.2, 156, 157, 158; 137/596.16, 569.17, 625.34, 625.64, 625.65; 251/129.15

[56] References Cited

U.S. PATENT DOCUMENTS

| | | | |
|---|---|---|---|
| 4,915,459 | 4/1990 | Hashida et al. | 303/119.2 |
| 5,234,030 | 8/1993 | Kervagoret et al. | 303/119.2 |
| 5,437,501 | 8/1995 | Kohno et al. | 303/117.1 |
| 5,577,815 | 11/1996 | Hashida | 303/119.2 |
| 5,878,782 | 3/1999 | Nakajima | 137/625.65 |

FOREIGN PATENT DOCUMENTS

| | | |
|---|---|---|
| 344544 | 12/1989 | European Pat. Off. . |
| 361502 | 4/1990 | European Pat. Off. . |
| 369412 | 5/1990 | European Pat. Off. . |
| 434092 | 6/1991 | European Pat. Off. . |
| 625455 | 11/1994 | European Pat. Off. . |
| 49-28307 | 7/1974 | Japan . |
| 5-65387 | 12/1989 | Japan . |
| 1416645 | 12/1975 | United Kingdom . |
| 9509098 | 4/1995 | WIPO . |
| 96/36518 | 11/1996 | WIPO . |

OTHER PUBLICATIONS

Copy of an English Language Abstract of JP No. 49–28307.
Copy of an English Language Abstract of JP No. 5–65387.
Copy of an English Language Abstract of International Patent Publication No. WO95/09098.

Primary Examiner—Robert J. Oberleitner
Assistant Examiner—Mariano Sy
Attorney, Agent, or Firm—Greenblum & Bernstein, P.L.C.

[57] ABSTRACT

A solenoid controlled valve comprises a spool. One end side of the spool is slidably inserted into a first fluid chamber of a sleeve in a fluid tight condition. The other end of the spool is loosely inserted into a second fluid chamber. The spool with a stationary orifice is provided in an inlet path extending in axial direction. A spring for urging the spool and a movable core fixed to the spool, and a coil are provided. When electric current is supplied to the coil, the movable core is attracted against the spring force and the spool moves opposite to the urging direction of the spring, so that the external peripheral face of the spool closes the first port and the second port.

6 Claims, 15 Drawing Sheets

NON-ANTILOCK CONTROL
(NORMAL PRESSURIZING MODE)

NON-ANTILOCK CONTROL
(NORMAL PRESSURIZING MODE)

DEPRESSURZING MODE

HOLDING MODE

SLOW PRESSURIZING MODE (METALING)

HOLDING MODE

HOLDING MODE

HOLDING MODE

HOLDING MODE

SOLENOID CONTROLLED VALVE AND ANTILOCK CONTROL APPARATUS USING THE SAME

BACKGROUND OF THE INVENTION

Field of the Invention

The present invention relates to a solenoid controlled valve to be used as an inlet valve in an antilock brake control apparatus for a vehicle.

An antilock brake control apparatus controls the fluid pressures to be applied upon a wheel cylinder in accordance with the skid status or the like of a wheel. Various controlling valves have been proposed for controlling such fluid pressure.

For example, Japanese Patent Publication No. 49-28307 discloses an antilock brake control apparatus as shown in FIG. 1. An inlet valve 4 composed of a normally open on/off type solenoid controlled valve is interposed in a main path 3 communicating a master cylinder 1 with a wheel cylinder 2. A discharge valve 8 composed of a normally closed on/off type solenoid controlled valve is interposed in a return path 7 returning from the wheel cylinder 2 to the main path 3 through a reservoir 5 and a pump 6.

The antilock brake control apparatus has three-type modes in the fluid pressure control during an antilock controlling time. Opening the discharge valve 8 and closing the inlet valve 4, working fluid within the wheel cylinder 2 is exhausted to the reservoir 5 (depressurizing mode). Closing the inlet valve 4 and the discharge valve 8, and the fluid pressure within the wheel cylinder 2 is held (holding mode). Closing the discharge valve 8 and opening the inlet valve 4, the fluid pressure within the wheel cylinder 2 is increased (pressurizing mode).

Japanese Patent Publication No. 5-65387 by the present applicant discloses, as shown in FIG. 2, an antilock brake control apparatus having an inlet valve 11 and a discharge valve 12. The inlet valve 11 and the discharge valve 12 are integrated with each other. The inlet valve 11 interposed in a main path 3 is a non-solenoid controlled type flow amount control valve. The discharge valve 12 interposed in the return path 7 is a normally closed on/off type solenoid controlled valve.

A similar configuration antilock brake control apparatus is described in WO95/09098 or the like.

The inlet valve 11 composed of a flow amount controlling valve has a sleeve 15 comprising a port 15a communicated with the master cylinder 1, ports 15b and 15c communicated with the wheel cylinder 2, and a port 15d communicated with the discharge valve 12. A spool 16 is accommodated slidably within the sleeve 15. A stationary orifice 17 is provided in an inlet path 16a passing in an axial direction through the spool 16. The spool 16 has a radially extending fluid passages 16b, 16c and 16d for communicating the inlet path 16a and the ports 15a through 15c. Further, the spool 16 is urged upwardly in the drawing by a spring 18. The discharge valve 12 which is the normally closed on/off type solenoid controlled valve has a movable core 21 in a valve body 20. The valve body 20 can be seated on a valve seat 19. When a coil 22 is energized, the valve body 20 moves downward in the drawing to open.

This type of antilock brake control apparatus has two-type modes in the fluid pressure control during the antilock controlling time. Namely, opening the discharge valve 12, the depressurizing mode is provided where the working fluid of the wheel cylinder 2 is exhausted into the reservoir 5. Closing the discharge valve 12, the pressurizing mode is provided where the fluid pressure within the wheel cylinder 2 is increased.

But, in the case that both the inlet valve 4 and the discharge valve 8 are on/off type solenoid controlled valves as shown in the FIG. 1, pressure increasing per unit time (pressurizing rate) becomes larger when the fluid pressure difference between the master cylinder 1 and the wheel cylinder 2 is large, even if the execution time of the pressurizing mode is the same, and the pressurizing rate becomes smaller when the fluid pressure difference is smaller. When the pressurizing rate during the pressurizing mode depends upon the fluid pressure difference between the master cylinder 1 and the wheel cylinder 2, it is difficult to control the fluid pressure with high accuracy.

Namely, as shown in FIG. 3(A), when a locking symptom is detected with the difference between a car body speed and a wheel speed becomes larger at a time t1, the depressurizing mode is carried out (time t1 through t2), and a holding mode is carried out (time t2 through t3) when the wheel speed is recovered. When the wheel speed is further recovered, the pressurizing mode (time t3 through t4) and the holding mode are alternately repeated (pressurizing/holding mode) to slowly increase the fluid pressure within the wheel cylinder 2 (time t3 through t5). When the wheel speed is further recovered, the pressurizing mode is carried out (time t3 through t4). As the difference between the vehicle speed and the wheel speed becomes immediately higher again due to the high pressurizing rate in this case, it becomes necessary to carry out the depressurizing mode. Thus, it is necessary to repeat the pressurizing/holding mode and the depressurizing mode at a short period. A period from the lock symptom produced to the next lock symptom produced (skid cycle) is short.

In the case that an inlet valve 11 is a non-solenoid controlled type flow amount controlling valve and the discharge valve 12 is a normally closed on/off type solenoid controlled valve as shown in FIG. 2, a spool 16 moves vertically due to the balance between a force applied upon a spool 16 by the fluid pressure difference before and after the stationary orifice 17 and the force of the spring 18 at the pressurizing mode. A variable orifice is composed by the repeated communication and interruption between the port 15a and the fluid passage 16b. Thus, the pressurizing rate during the pressurizing mode is constant independently of the fluid pressure difference between the master cylinder 1 and the wheel cylinder 2, and the pressurizing rate is small (slow pressurizing). In this terms, the flow amount control type inlet valve 11 is advantageous in the fluid pressure control. But the antilock brake control apparatus of FIG. 2 can not make the fluid pressure overshoot small, because the apparatus cannot carry out the holding mode.

When the wheel speed is recovered by the pressure decreasing within the wheel cylinder 2 in a depressurizing mode (time t1 through t2) after the locking symptom has been detected as shown in FIG. 3(B), the pressurizing mode is immediately carried out (time t2 through t3). When the pressurizing mode is only carried out without execution of the holding mode in this manner, the fluid pressure of the wheel cylinder 3 is increased more than necessary (fluid pressure overshoot), and the locking symptom is detected again (time t3). As the result, the skid cycle in this case becomes much shorter than the skid cycle in the case that both the inlet valve 4 and the discharge valve 8 are an on/off type solenoid controlled valve. A locking symptom is apt to be caused by the fluid pressure overshoot, thereby the depressurizing mode is necessary to be carried out frequently. Thus, the total pressure reduction of one antilock controlling is large. As this reason, the pump 6 for pumping a working fluid from the reservoir 5 to the master cylinder 1 bears large load. Consequently, the pump 6 is necessary to be higher in pumping performance.

SUMMARY OF THE INVENTION

Accordingly, an object of this invention is to provide a solenoid controlled valve which is capable of executing three types of modes, a depressurizing mode, a holding mode and a pressurizing mode when it is used as an inlet valve in an antilock brake control apparatus, and can execute the pressurizing mode as a slow pressurizing in which fluid pressure increasing is constant and slow.

In order to solve the problems, there is provided a solenoid controlled valve comprising:

a sleeve having a first fluid chamber, a second fluid chamber larger in diameter than the first fluid chamber and axially continuously provided to the first fluid chamber, a first port, a second port and a third port communicated with the first fluid chamber, and a fourth port communicated with the second fluid chamber, these ports being provided on external peripheral face of the sleeve, the second port and the third port being merged;

a spool being inserted slidably at its one end side, in a fluid tight condition, into a first fluid chamber of the sleeve, being inserted loosely at its other end into the second fluid chamber of the sleeve, the spool having an inlet path, a stationary orifice for partitioning the inlet path into a first portion and a second portion, a first fluid passage and a second fluid passage for communicating the first portion of the inlet path with an external peripheral face of the spool, and a third fluid passage for communicating the second portion of the inlet path with the second fluid chamber of the sleeve;

an elastic means for urging the spool in one way;

a movable core to be engaged with the spool; and coils for generating a magnetic field to attract the movable core in a direction opposite to the urging direction of the elastic means by supplying an electric current;

whereby, at the time of the spool being in an engaging position by the urging force of the elastic means, a large flow path is formed from the first port to the second port through the first fluid passage, the first portion of the inlet path and the second fluid passage;

at the time of the fourth port being opened, the spool moves opposite to the urging direction of the elastic means, thereby a large flow path for communicating the third port with the fourth port through the second fluid chamber is formed;

at the time of the fourth port being closed after once opened, a small flow path for communicating in a constant flow amount the first port with the third port through a variable orifice composed by the first port and the first fluid passage, the first port of the inlet path, the stationary orifice and the second portion of the inlet path is formed; and at the time of the movable core being attracted against the spring force of the elastic means by feeding to the coil, a spool moves opposite to the urging direction of the elastic means, thereby the external peripheral face of the spool closes the first port.

There is also provided an antilock control apparatus wherein the above mentioned solenoid controlled valve is provided, the first port of the solenoid controlled valve is connected with a master cylinder, the second port and the third port are connected with a wheel cylinder, a return path for connecting the fourth port with the master cylinder side of the main path is provided, and a normally-closed on/off type solenoid controlled valve and a reservoir are interposed in the return path, the antilock control apparatus having a controlling means capable of carrying out;

a normal pressurizing mode where the coil of the solenoid controlled valve is made non-energizing and the on/off type solenoid controlled valve is closed, thereby, the spool is positioned in the engaging portion by the urging force of the elastic means, the large flow path which communicates the master cylinder with the wheel cylinder through the first port, the first fluid passage, the first portion of the inlet path, the second fluid passage and the second port is formed;

a depressurizing mode where the coil of the solenoid controlled valve is made non-energizing and the on/off type solenoid controlled valve is open, thereby, the spool is moved opposite to the urging direction of the elastic means by pressure-decreasing of the fourth port, a large flow path for communicating the wheel cylinder with the reservoir through the third port, the second fluid chamber, the fourth port and the on/off type solenoid controlled valve is formed;

a holding mode where after the depressurizing mode, a feeding operation is conducted to the coil of the solenoid controlled valve to attract the movable core against the spring force and the normally-closed on/off type solenoid controlled valve is closed, thereby, the spool moves in a direction opposite to the urging direction of the elastic means, the first port is closed by the external peripheral face of the spool to cut off the communication between the wheel cylinder and the master cylinder; and a slow pressurizing mode where after the depressurizing mode, the coils of the solenoid controlled valve is made non-energizing and the normally-closed on/off type solenoid controlled valves closed, a small flow path for communicating in a constant flow amount the master cylinder with the wheel cylinder through the first port, the variable orifice composed of the first port and the first fluid communicating passage, the first portion of the introducing path, the stationary orifice, the second portion of the inlet path, and the third port is formed.

In accordance with the antilock braking control apparatus of this invention, an antilock braking controlling operation can be conducted by three types of modes, i.e., the pressurizing mode, the holding mode and the slow pressurizing mode. The antilock braking control apparatus can execute a suitable antilock controlling operation, because the slow pressurizing mode has slow and constant pressurizing rate.

Preferably, the solenoid controlled valve comprises a fifth port for communicating the first fluid chamber with the external peripheral face of the spool on the engaging position side by the urging force of the elastic means;

a flow path for communicating the fifth port with the master cylinder side of the main path; and a first check valve which permits the working fluid to flow from the fifth port in the flow path to the master cylinder, meanwhile prevents the working fluid from flowing from the master cylinder to the fifth port.

In such a configuration, a wheel cylinder can be prevented from becoming a pressure-disabled status by a double braking operation for abruptly reducing and increasing the pressure of the master cylinder in the holding mode. Namely, when the fluid pressure of the master cylinder is reduced in holding mode, a second portion becomes higher in the fluid pressure than the first portion of the inlet path although the working fluid within the wheel cylinder is restored to the master cylinder through the stationary orifice and the flow path. When the total of the fluid pressure difference force and the spring urging force exceeds the solenoid force, the spool moves to the position where the first port is communicated with the first fluid passage against the solenoid force, and the working fluid can be fed from the master cylinder to the wheel cylinder.

Further, the solenoid controlled valve preferably comprises a second check valve which permits the working fluid to flow from the first portion of the inlet path to the second portion of it, meanwhile prevents the working fluid from flowing from the second portion to the first position. In this case, a pressure-disabled status by the double braking operation in the depressurizing mode can be prevented more surely. Although the working fluid is restored from the first portion of the inlet path to the master cylinder when the working fluid of the master cylinder is reduced in the holding mode, the second portion is nor reduced, because the communication between the first portion and the second portion is broken by a second check valve. As the fluid pressure difference between the first portion and the second portion when the fluid pressure of the master cylinder is reduced, the spool is moved surely against the solenoid force.

Preferably, the second check valve is provided in the second portion of the inlet path. Further in this case, the second check valve has a spherical body and a holder which retains the spherical body in a position opposite to the stationary orifice, and allows the working fluid to pass. In this case, the construction of the apparatus is simpler.

Preferably, control means stops the feeding to the coil of the solenoid controlled valve intermittently in the predetermined time interval in the holding mode. In this case, when the feeding to the coil has been stopped, the spool is moved to the position where the first port is communicated with the first fluid passage by the differential force and the solenoid force. Thus, a pressure-disabled status by the double braking operation in the holding mode can be prevented more surely.

In the antilock control apparatus using the solenoid controlled valve according to the present invention, an antilock controlling operation composed of three types of modes, namely, the pressurizing mode, the holding mode and the slow pressurizing mode can be effected and the slow pressurizing mode becomes constant at the pressurizing rate. When the solenoid controlled valve of the present invention is used as the inlet valve of the antilock control apparatus, since the fluid pressure overshooting can be prevented, the skid cycle can be made longer, the pressure decreasing within the wheel cylinder can be controlled to minimum and the total decreasing pressure amount by one antilock controlling can be reduced.

When a first check valve allowing only the flowing of the working fluid from the fifth port side to the master cylinder is provided in the flow path for communicating the fifth port which communicates the first fluid chamber with the external peripheral face of the spool on the side of the engaging position, with the master cylinder side of the main path, the wheel cylinder can be prevented from becoming the pressure disabled status even when the double brake operation has been executed during the holding mode.

In this case, a second check valve which permits only the flowing of the working fluid from the master cylinder 1 in the inlet path of the spool to the wheel cylinder 2 is provided in the inlet path of the spool so as to more surely prevent the pressure disabled status of the wheel cylinder.

In the case of stopping electric current supply to the coils of the solenoid controlled valve intermittently in the predetermined time interval during the holding mode, the wheel cylinder can be prevented from being the pressure disabled status more surely.

BRIEF DESCRIPTION OF THE DRAWINGS

Other objects and features of the present invention will become apparent from the following description taken in conjunction with the preferred embodiments thereof with reference to the accompanying drawings, in which:

FIG. 3 (C) is a diagram showing an antilock controlling in embodiments of the present invention;

DETAILED DESCRIPTION OF THE PREFERRED EMBODIMENT

First Embodiment

Figure 1:
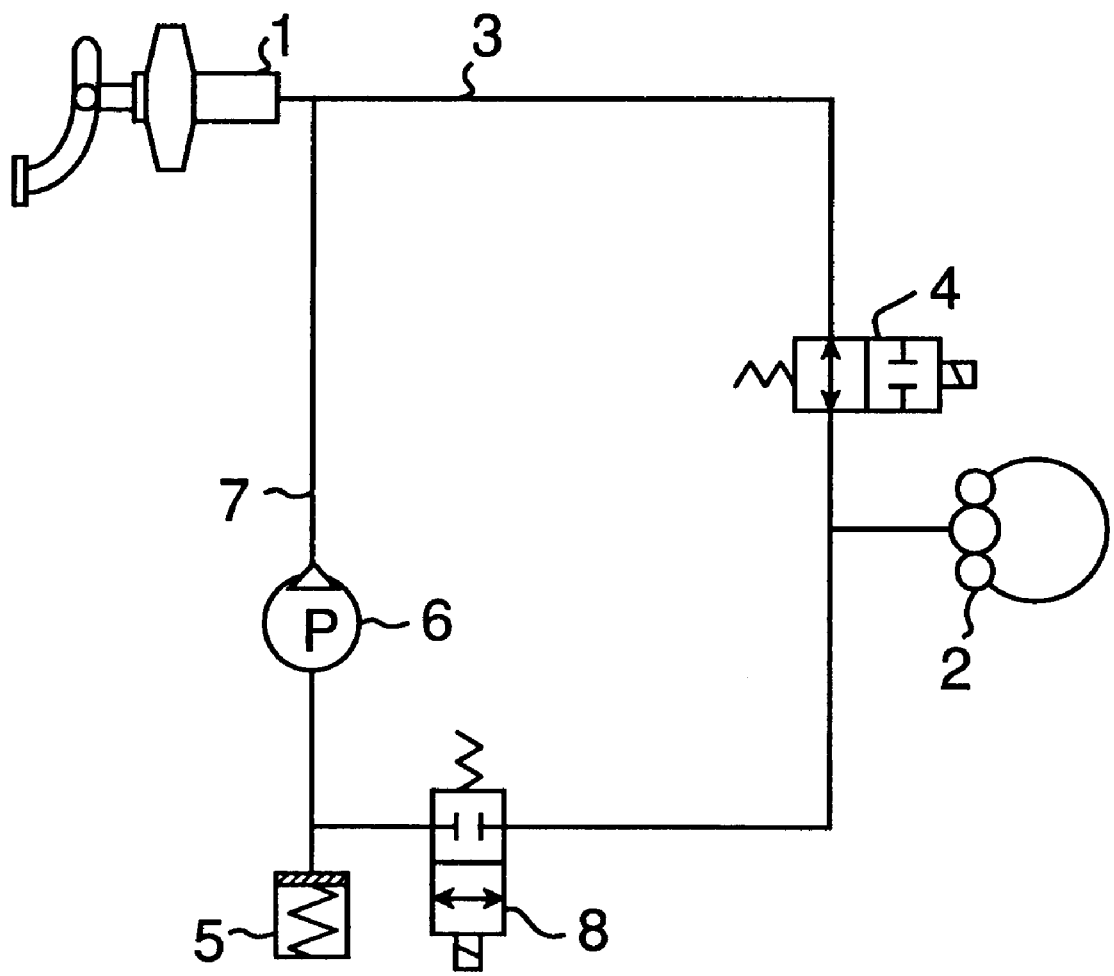
FIG. 1 is a schematic configuration view showing a first prior art antilock control apparatus.
Figure 2:
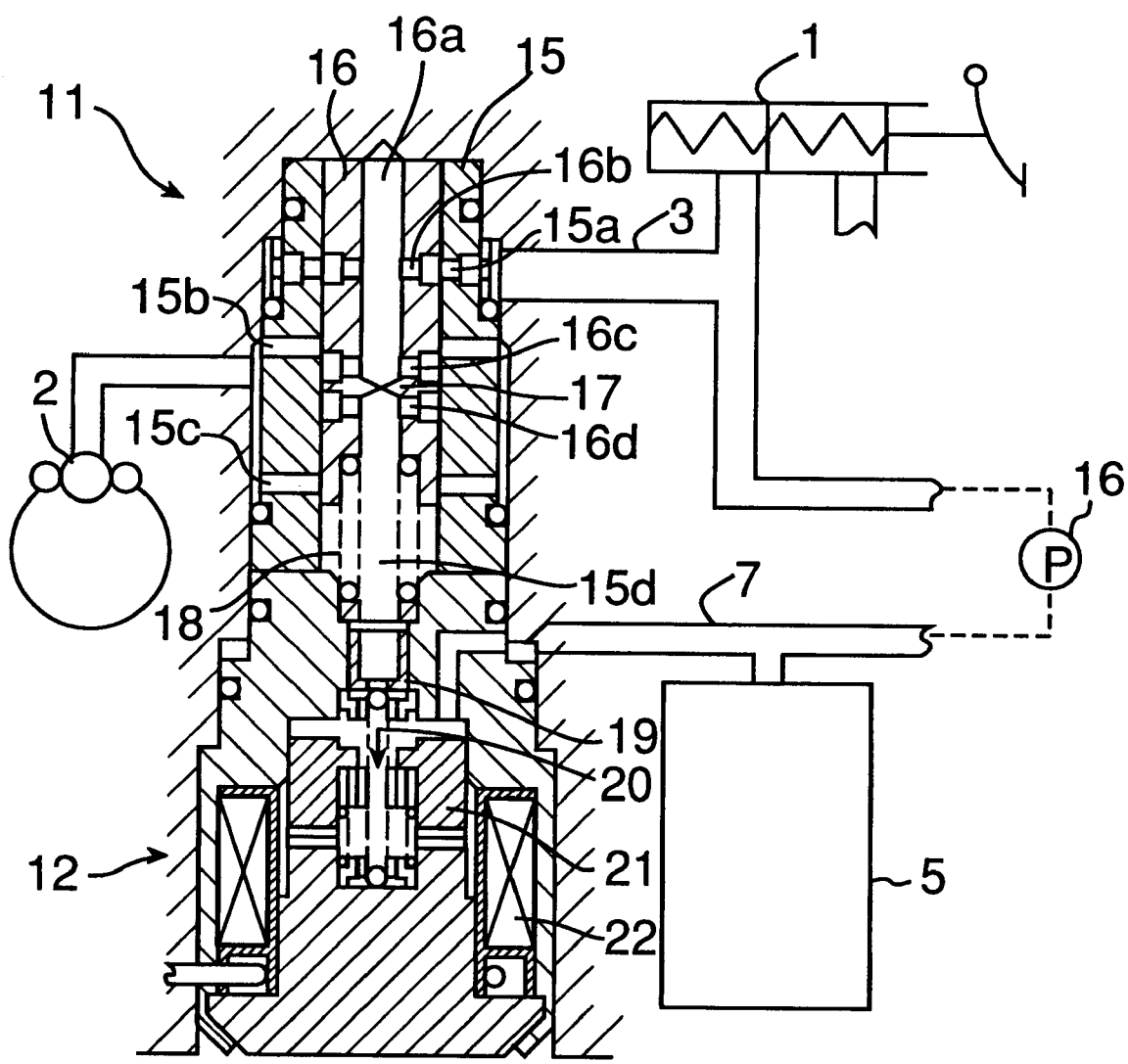
FIG. 2 is a schematic configuration view showing a second prior art antilock control apparatus.
Figure 4:
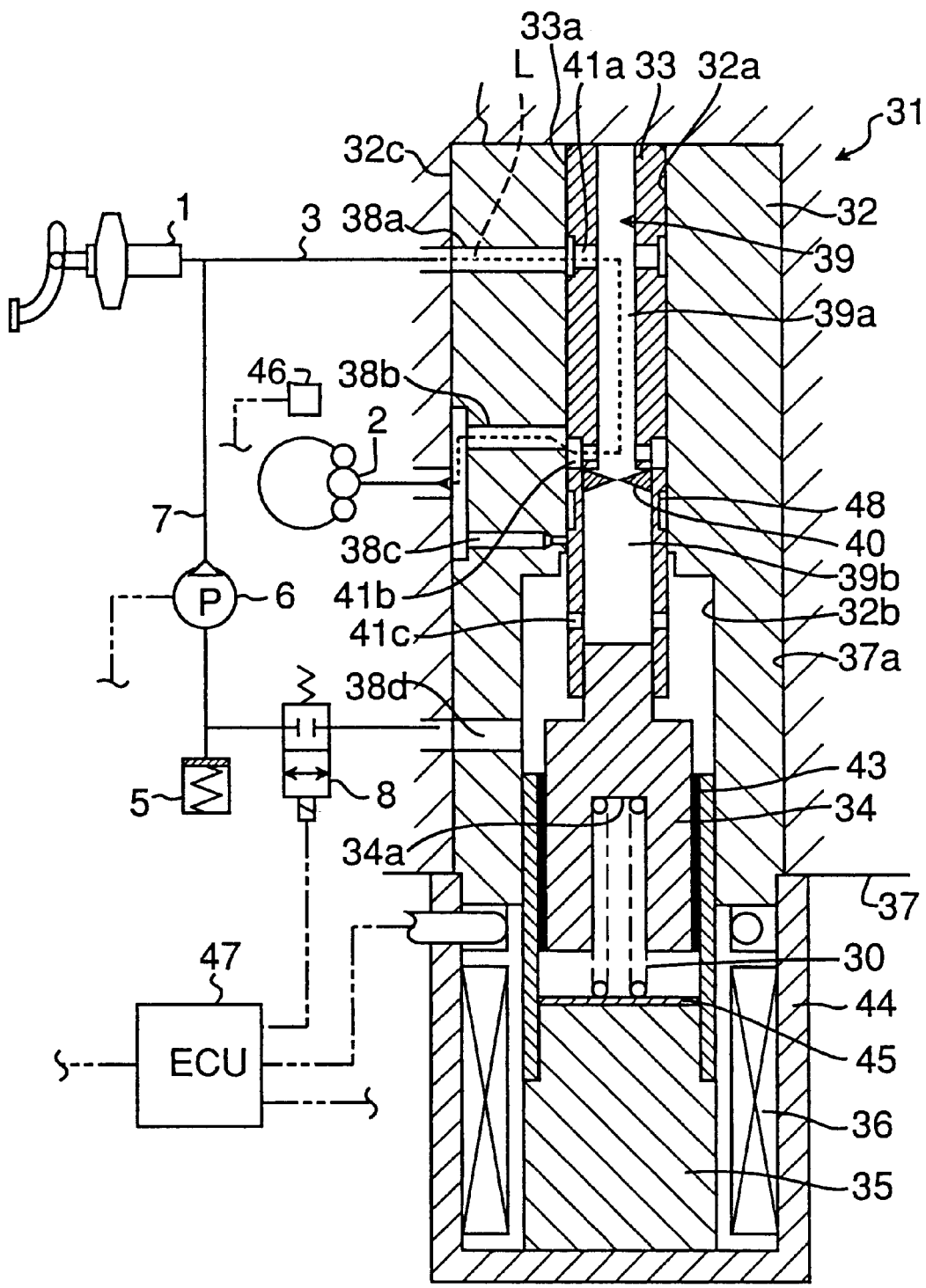
FIG. 4 is a schematic configuration view showing an antilock brake control apparatus provided with a solenoid controlled valve according to a first embodiment of the present invention.

FIG. 4 shows an antilock brake control apparatus with a solenoid controlled valve 31 according to the first embodiment of the present invention as an inlet valve. Referring to FIG. 4, the same reference numerals are given to the elements the same as those of FIG. 1 and FIG. 2.

The solenoid controlled valve 31 is mainly composed of a sleeve 32, a spool 33, a movable core 34, a stationary core 35, a coil 36 and a spring 30.

The sleeve 32 is fixed within a mounting hole 37a of a cylinder block 37. A first fluid chamber 32a, and a second fluid chamber 32b larger in diameter than the first fluid chamber 32a are provided so as to extend axially. A first through a fourth ports 38a through 38d which are provided on the external peripheral face 32c of the sleeve 32 are communicated with the first fluid chamber 32a or the second fluid chamber 32b. The first port 38a is communicated with the first fluid chamber 32a, and is connected with the master cylinder 1 side of the main path 3. The second port 38b and the third port 38c are respectively open in one end to the first fluid chamber 32a, and are connected with each other in the other end in the external peripheral face 32c of the sleeve 32 to be connected with the wheel cylinder 2. Further, a fourth port 38d is communicated with a second fluid chamber 32b, and is connected with a discharge valve 8 which is the normally-closed on/off type solenoid controlled valve. A sleeve can be made of a cylinder block 37 without the sleeve 32 and the cylinder block 37 being made independent.

The upper end side of the spool 33 in the drawing is slidably provided with a first fluid chamber 32a of the sleeve 32 in a fluid tight condition. The lower end side of the spool 33 is projected loosely inserted into a second fluid chamber 32b of the sleeve 32. An inlet path 39 extending in an axial direction is provided in the spool 33. A stationary orifice 40 is provided in the longitudinal portion of the inlet path 39. The stationary orifice 40 partitions the inlet path 39 into a first portion 39a and a second portion 39b.

A first fluid passage 41a through a third fluid passage 41c are provided in the spool 33. These fluid passages 41a through 41c extend diametrically and communicate the external peripheral face 33a with the inlet path 39. The first fluid passage 41a communicates the external peripheral face 33a with the first portion 39a of the inlet path 39 on the upper end side of the spool 33. The second fluid passage 41b communicates the external peripheral face 33a with the first portion 39a of the inlet path 39 on the upper end side of a stationary orifice 40. The third fluid passage 41c communicates the external peripheral face 33a with a second portion 39b of the inlet path 39 on the lower end side of the spool 33. A communicating concave portion 48 is formed on the external peripheral face 33a of the boundary portion between an engaged portion, into the first fluid chamber 32a of the spool 33, and a loosely inserted portion into the second fluid chamber 32b.

A sealing member 43 is interposed between the external periphery of a movable core 34 fixed to the lower end of the spool 33 and the peripheral wall of the second fluid chamber 32b of the sleeve 32. The movable core 34 can slide freely within the second fluid chamber 32b.

A casing member 44 is mounted on the lower end side of the sleeve 32. The stationary core 35 is fixed within the casing member 44. Coils 36 are wound around the core 35. The lower end portion of the sealing member 43 is externally engaged with the upper portion of the stationary core 35.

A spring 30 is compressed between a spring receiving member 45 made of a non-magnetic body placed on the upper end of the stationary core 35 and the bottom portion of a spring receiving concave portion 34a provided on the lower end side of the movable core 34. The spring 30 for composing an elastic means urges the spool 33 elastically upwards in the drawing.

An electronic control unit 47 illustrated in FIG. 4 carries out calculation process for estimation of the vehicle speed and the wheel speed or for detection of the locking symptom to actualize antilock brake control on the basis of signals inputted from various sensors such as car wheel speed sensor 46 or the like. In accordance with the calculation results, the electronic control unit 47 drives the discharge valve 8 and the pump 6 as well as the coil 36 of the solenoid controlled valve 31.

The operation of the solenoid controlled valve 31 of the first embodiment will be described.

In a non-antilock control operation (normal pressurizing mode) shown in FIG. 4, electric current is not supplied to the coils 36 of the solenoid controlled valve 31 and the discharge valve 8 is in a valve closed status. Thus, the upper end of the spool 33 is in contact with the upper end portion of a mounting hole 37a in the drawing by the urging force of the spring 30. In this status, the first port 38a of the sleeve 32 is in communication with the first fluid passage 41a of the spool 33. Further, the second port 38b of the sleeve 32 is in communication with the second fluid passage 41b of the spool 33. Thus, as shown with dotted lines L in FIG. 4, the working fluid is supplied from the master cylinder 1 to the wheel cylinder 2 through the first port 38a, the first fluid passage 41a, the first portion 39a of the inlet path 39 of a spool 33, the second fluid passage 41b and the second port 38b.

Figure 5:
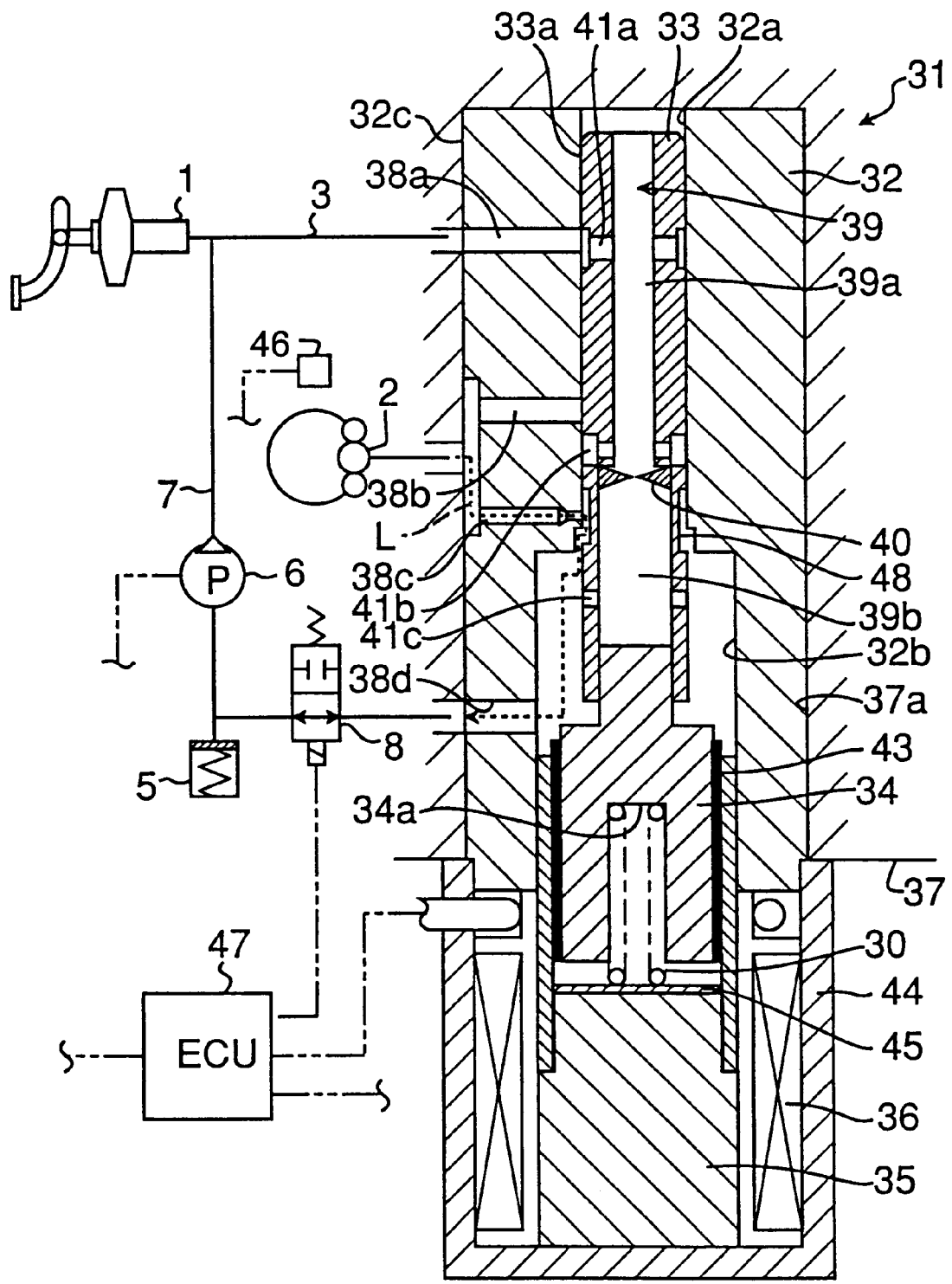
FIG. 5 is a schematic configuration view showing a depressurizing mode of the antilock brake control apparatus of FIG. 4.

When the electronic control unit 47 detects the locking symptom, the discharge valve 8 is opened as shown in FIG. 5 and electric current is not supplied to the coils 36 of the solenoid controlled valve 31 (depressurizing mode).

Even when electric current is supplied to the coils 36, a depressurizing mode can be realized. At this time, since the working fluid within the second fluid chamber 32b of the sleeve 32 is discharged to the reservoir 5 through the discharge valve 8, the fluid pressure in the second portion 39b of the inlet path 39 of the spool 33 which is communicated with the second fluid chamber 32b through the third fluid passage 41c is decreased. Thus, since the fourth port 38d side is decreased in pressure in this manner, the fluid pressure of the first portion 39a of the inlet path 39 becomes higher than that of the second portion 39b. The spool 33 moves downward to a position shown in FIG. 5 against the urging force of the spring 30 by the fluid pressure difference. As a result, the first port 38a of the sleeve 32 is communicated with the first fluid passage 41a of the spool 33. On the other hand, the second port 38b of the sleeve 32 is closed by the external peripheral face 33a of the spool 33. Further, the third port 38c of the sleeve 32 is communicated with the second fluid chamber 32b through the communication concave portion 48 provided in the external peripheral face 33a of the spool 33. As shown in with dotted lines L in FIG. 5, the working fluid within the wheel cylinder 2 is discharged to the reservoir 5 through the third port 38*c*, the communicating concave portion 48, the second fluid chamber 32*b* of the sleeve 32, the fourth port 38*d* and the discharge valve 8.

Figure 6:
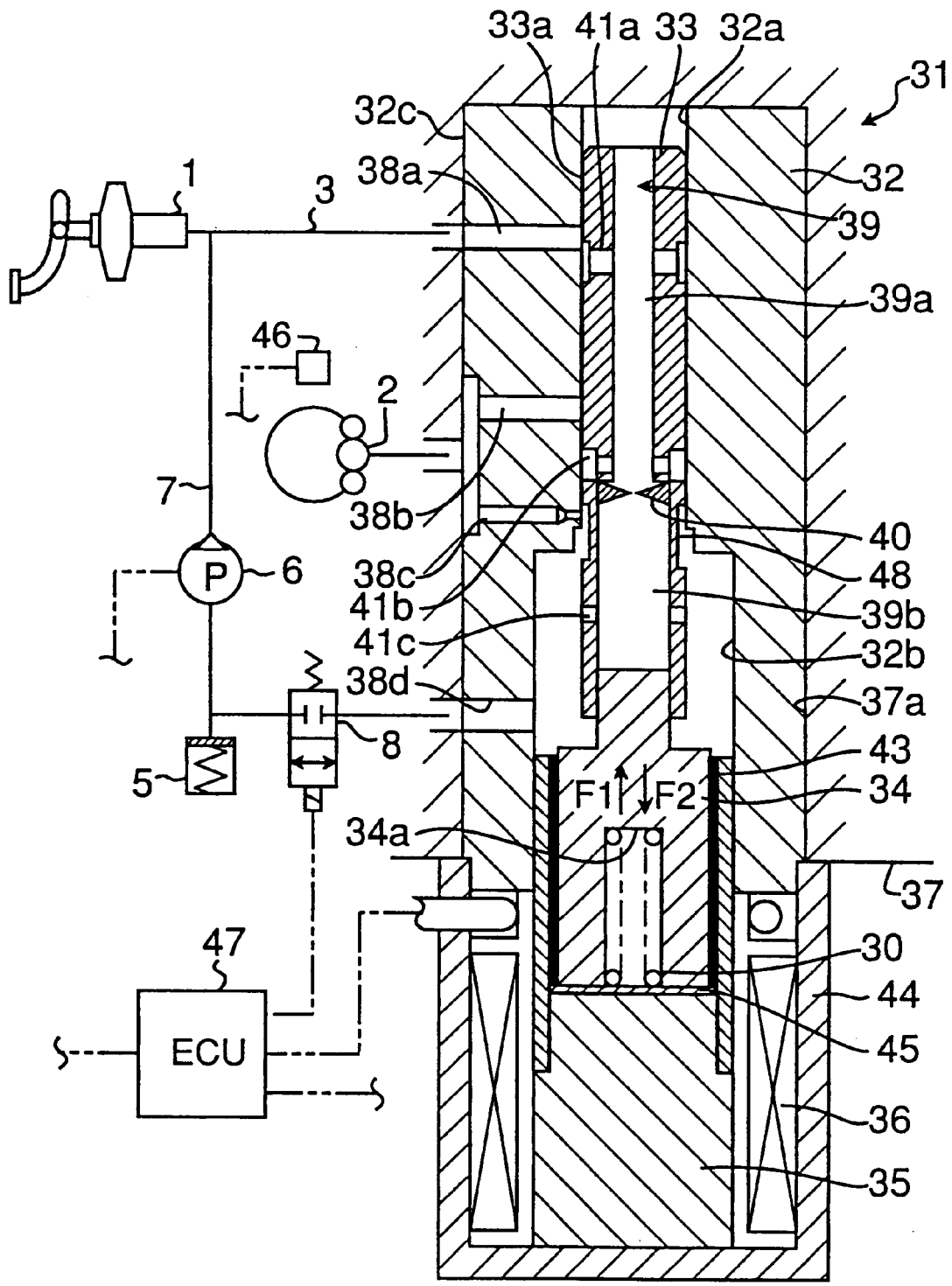
FIG. 6 is a schematic configuration view showing a holding mode of the antilock brake control apparatus of FIG. 4.

When the electronic control unit 47 detects the recovery of the wheel speed during the depressurizing mode (FIG. 5), the discharge valve 8 is closed as shown in FIG. 6 and electric current is supplied to the coils 36 of the solenoid controlled valve 31. The movable core 34 which has been attracted to a magnetic field generated by the coils 36 moves downward against the urging force of the spring 30 to come into contact with the stationary core 35. At this time, the first port 38*a* of the sleeve 32 is closed by the external peripheral face 33*a* of the spool 33. Thus, the communication between the master cylinder 1 and the wheel cylinder 2 is cut off. On the other hand, the third port 38*c* is communicated with the second fluid chamber 32*b* through the communicating concave portion 48. The communication between the wheel cylinder 2 and the reservoir 5 is cut off due to the closure of the discharge valve 8 as described. Thus, in this status, the fluid pressure with the wheel cylinder 2 is held (holding mode).

In the holding mode, the attractive force (solenoid force F2) of the magnetic field generated by the coils 36 working upon the movable core 34 against the urging force (spring force F1) of the spring 30 moves the spool 33 downward. Namely, solenoid force F1 and spring force F2 have relationship as (F2>F1).

Figure 7:
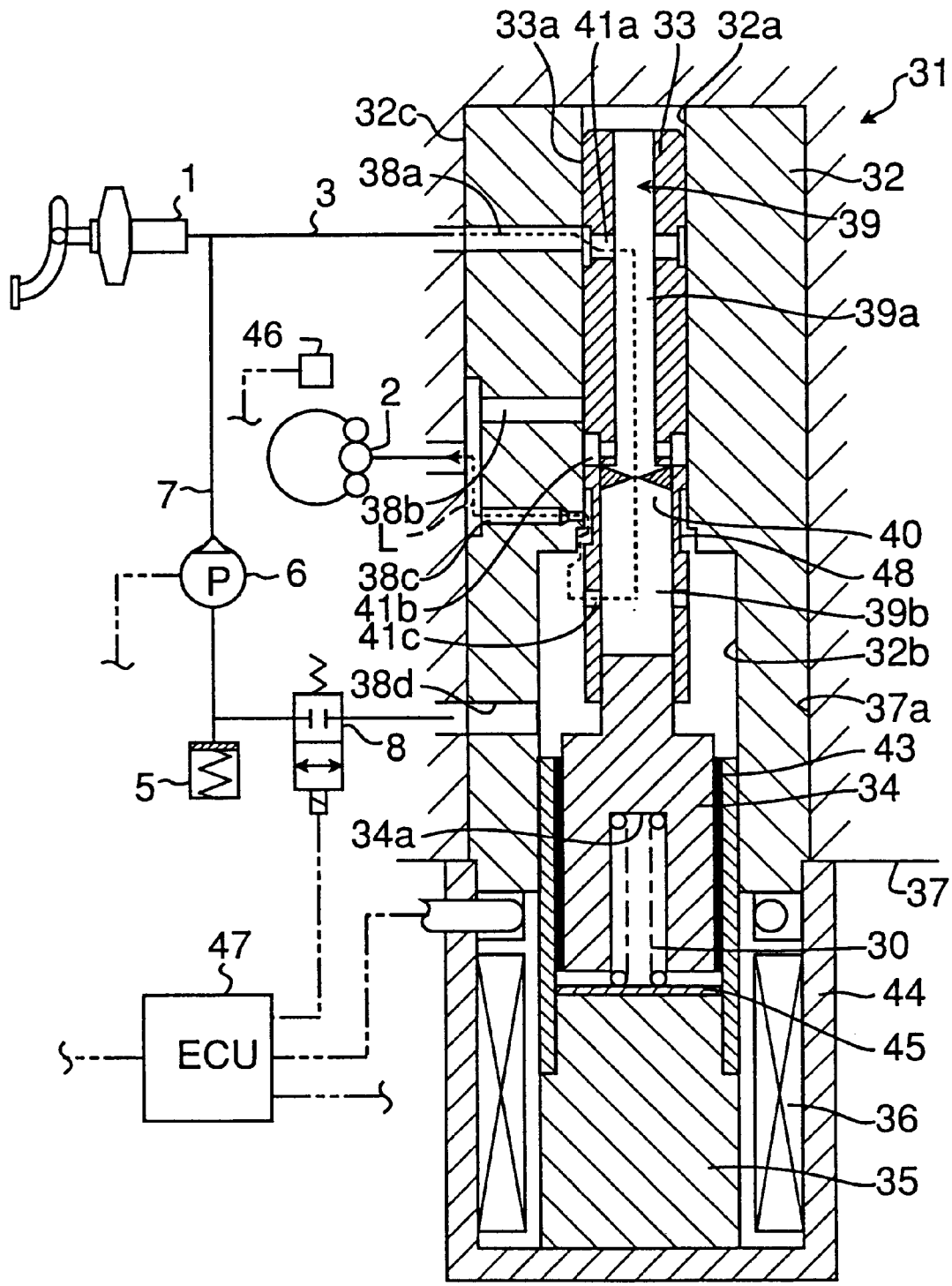
FIG. 7 is a schematic configuration view showing a slow pressurizing mode of the antilock brake control apparatus of FIG. 4.

When electric current supply to the coils 36 of the solenoid controlled valve 31 is stopped in the holding mode (FIG. 6), a slow pressurizing mode shown in FIG. 7 is created. In the slow pressurizing mode, the first port 38*a* and the first fluid passage 41*a* of the spool 33 act as a variable orifice. The variable orifice permits a constant flow amount of working fluid to flow. The flow amount is predetermined by the given pressure difference to be decided by the urging force of the spring 30 and the sectional area of the spool 33, and the opening area of the stationary orifice 40. When the fluid pressure difference between the master cylinder 1 and the wheel cylinder 2 is larger than the given pressure difference, the pressure of the first portion 39*a* increases to make the fluid pressure difference between the first and the second portion 39*b* larger. Consequently the spool 33 moves downwardly against the urging force of the spring 30 to close the first port 38*a* by the external peripheral face 33*a* of the spool 33. On the other hand, when the fluid pressure difference between the master cylinder 1 and the wheel cylinder 2 is smaller than the given pressure difference, since the fluid pressure difference between the first portion 39*a* and the second portion 39*b* becomes smaller, the spool 33 moves upward by the urging force of the spring 30 to communicate the first port 38*a* with the first fluid passage 41*a* as shown in FIG. 7. The first port 38*a* and the first fluid passage 41*a* repeats communication and interruption by such vertical motion of such the spool 33 (metaling) to retain constant the pressure difference before and after the stationary orifice 40. As this result, the amount of the working fluid which passes into the stationary orifice 40 is retained constant. Namely, as shown with dotted lines L in FIG. 7, constant and a small amount of working fluid is supplied from the master cylinder 1 to the wheel cylinder 2 through the first port 38*a*, the first fluid passage 41*a*, the first portion 39*a* of the inlet path 39, the stationary orifice 40, the second portion 39*b* of the inlet path 39, the third fluid passage 41*c*, the second fluid chamber 32*b*, the communicating concave portion 48 and the third port 38*c*. The pressurizing rate in the slow pressurizing mode is lower than that in the ordinary pressurizing mode. Further the pressurizing rate is constant independently of the fluid pressure difference between the master cylinder 1 and the wheel cylinder 2.

If the pressure difference between the first portion 39*a* and the second portion 39*b* becomes lower than the given pressure difference, since the working fluid is supplied to the second portion 39*b* of the inlet path 39 through the stationary orifice 40 in the slow pressurizing mode, the spool 33 moves upwardly to the upper end portion shown in FIG. 4 by the urging force of the spring 30.

Figure 3A:
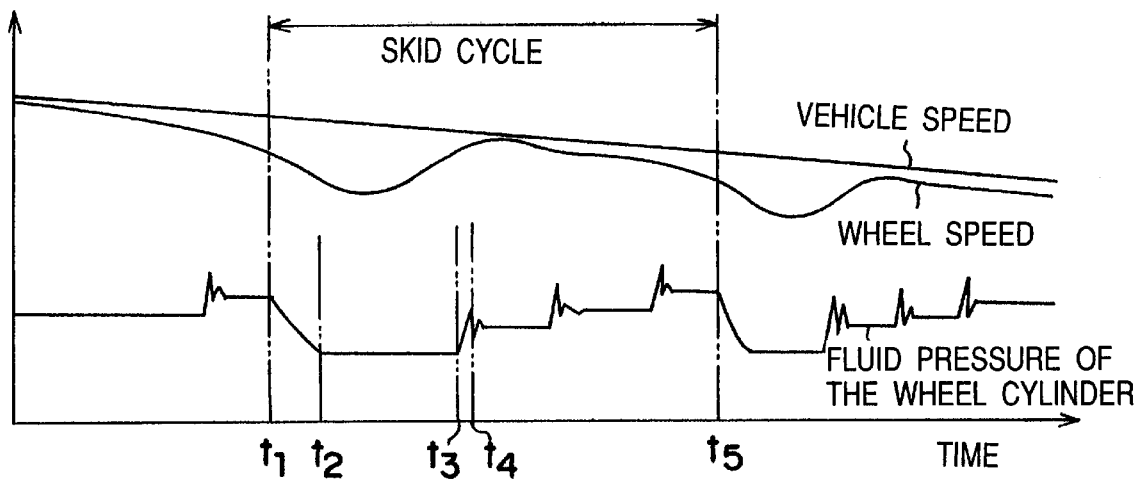
FIG. 3(A) is a diagram showing an antilock controlling in the first prior art antilock control apparatus.
Figure 3B:
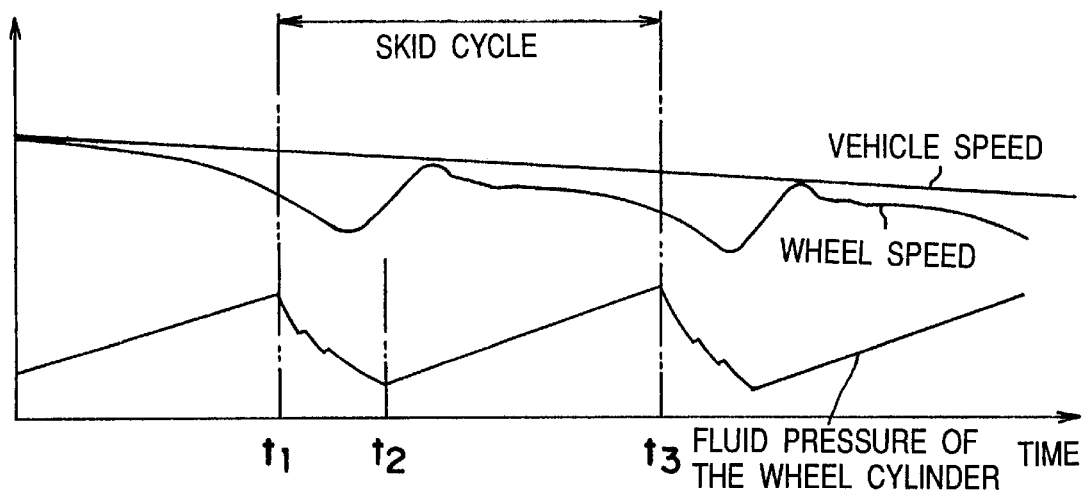
FIG. 3 (B) is a diagram showing an antilock controlling in the second prior art antilock control apparatus.
Figure 3C:
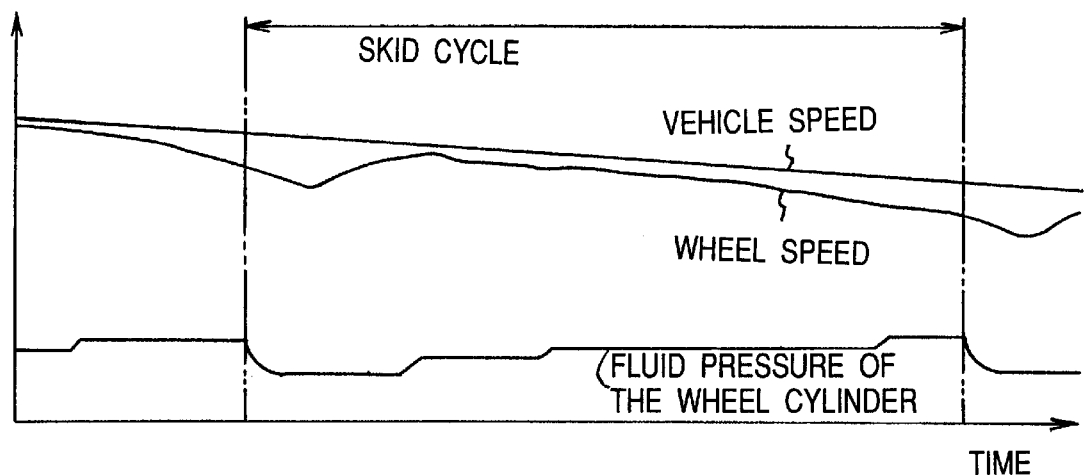

As described above, when the solenoid controlled valve 31 of the present invention is used as an inlet valve for an antilock brake control apparatus, a fluid pressure can be controlled by three types of modes, i.e. , the slow pressurizing mode, the depressurizing mode and the holding mode. Also, the pressurizing rate of the slow pressurizing mode is constant. Thus, the fluid pressure within the wheel cylinder 2 can be increased very slowly, with monitoring the locking symptom of the wheel as shown in FIG. 3(C). Accordingly, the fluid pressure overshoot is prevented, thereby the pressure decreasing within the wheel cylinder 2 can be controlled in the necessary minimum. As the fluid pressure overshooting is prevented as described above, a skid cycle is shorter than that of the antilock control in which both the inlet valve and the discharge valve are the on/off type solenoid controlled valve as shown in FIG. 3(A), and that of the antilock control in which the inlet valve shown in FIG. 3(B) is the non-electromagnetic operation type flow amount control valve, and the discharge valve is the on/off type solenoid controlled valve. As the result, the total pressure decreasing amount during one antilock controlling operation can be reduced. Thus, the pump 6 bears small road to restore the working fluid discharged into the reservoir 5 to the master cylinder 1. As this reason, the pump 6 can have lower pumping ability.

Figure 8:
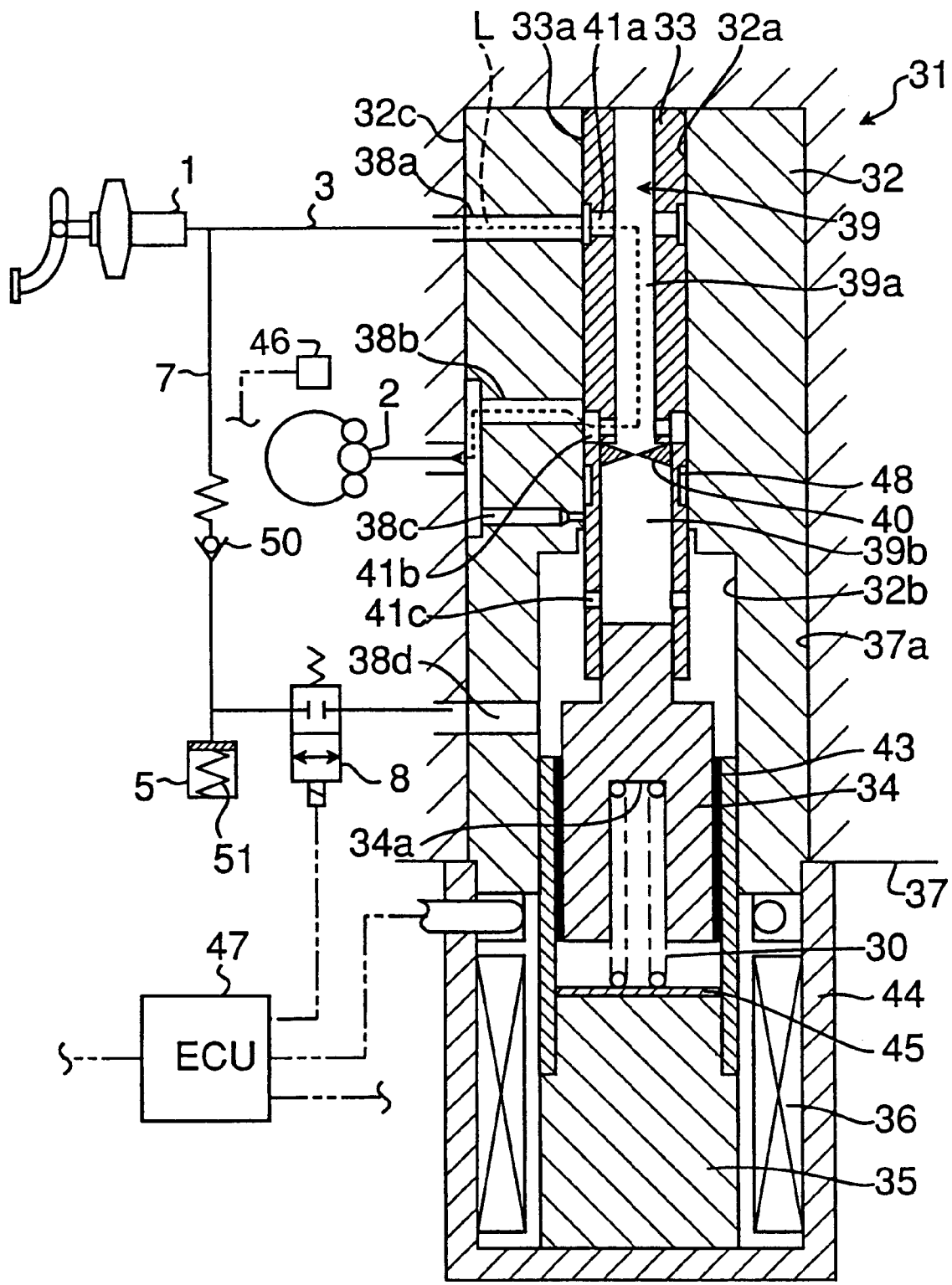
FIG. 8 is a schematic configuration view showing another example of an antilock brake control apparatus provided with the solenoid controlled valve according to the first embodiment of the present invention.

When the solenoid controlled valve 31 of the first embodiment is used as an inlet valve of an antilock brake control apparatus as described above, a working fluid amount to be discharged to the reservoir 5 is also reduced, because the pressure decreasing amount at one antilock control operation is reduced. Thus, as shown in FIG. 8, a check valve 50 is provided without a pump so that the working fluid can be returned to the wheel cylinder 1 with the urging force of the spring 51 which the reservoir 5 has.

Figure 9:
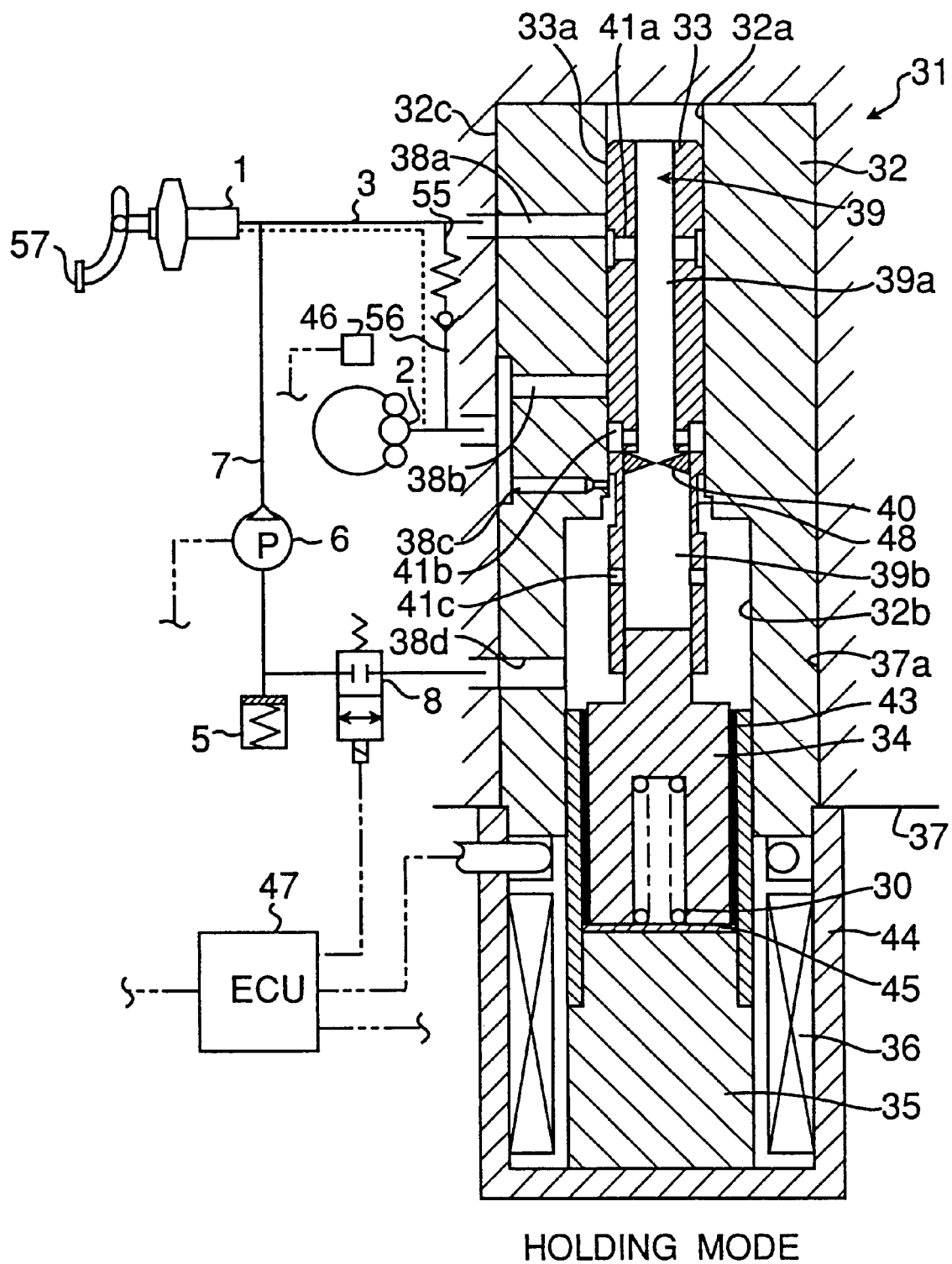
FIG. 9 is a schematic configuration view showing yet another example of an antilock brake control apparatus provided with a solenoid controlled valve according to the first embodiment of this invention.

When the solenoid controlled valve 31 of the first embodiment is used as an inlet valve of the antilock brake control apparatus as shown in FIG. 9, a flow path 55 for communicating the wheel cylinder 2 with the master cylinder 1 side of the main path 3 can be provided. A check valve 56 is preferably provided with the flow path 55 which permits the working fluid to flow from the wheel cylinder 2 to the side of the master cylinder 1 and prevents the working fluid from flowing from the master cylinder 1 to the wheel cylinder 2.

When the flow path 55 and the check valve 56 are provided, in releasing a stepping operation of a brake pedal 57 by a driver during the holding mode, the working fluid within the wheel cylinder 2 returns to the wheel cylinder 2 through the flow path 55 to decrease the fluid pressure in the wheel cylinder 2.

Second Embodiment

When the flow path 55 and a check valve 56 are provided as in FIG. 9, in the case of releasing the stepping operation of the brake pedal 57 during the holding mode, the fluid pressure of the wheel cylinder 2 can be decreased. However, in the antilock brake control apparatus of FIG. 9, inconveniences occur in the case that during the holding mode of the antilock controlling, a driver releases his stepping operation by suddenly leaving his foot from the brake pedal 57 and suddenly conducts a stepping operation on the brake pedal 57 without time interval (double braking operation).

Namely, even when the bake pedal 57 is stepped again after releasing the stepping of the brake pedal 57, the working fluid cannot be supplied to the wheel cylinder 2 through the connecting flow path 55, because the check valve 56 prevents the flowing of the working fluid from the master cylinder 1 to the wheel cylinder 2. Also, the working fluid to the wheel cylinder 2 cannot be supplied through the solenoid controlled valve 31, because the first port 38a is interrupted by the external peripheral face 33a of the spool 33. When the double brake operation is executed during the holding mode of the antilock control of the antilock control apparatus of FIG. 9, no braking status where the fluid pressure within the wheel cylinder 2 cannot be increased occurs.

Figure 10:
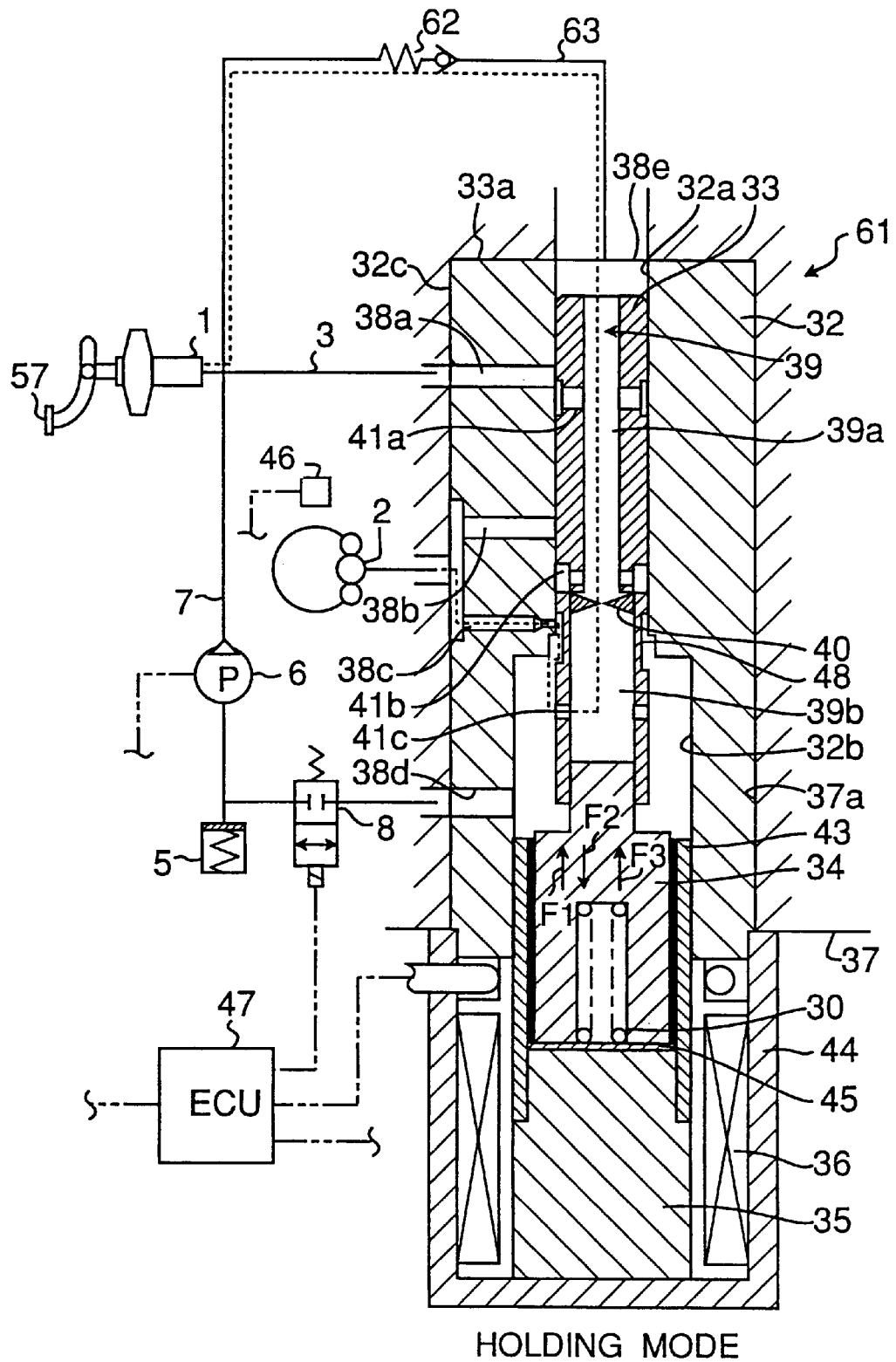
FIG. 10 is a schematic configuration view showing a holding mode of an antilock brake control apparatus provided with a solenoid controlled valve according to a second embodiment of the present invention.

In the second embodiment shown in FIG. 10, the fluid pressure within the wheel cylinder 2 can be increased in the case of executing the double brake operation during the holding mode of the antilock control.

In the solenoid controlled valve 61 in the second embodiment 2 as shown in FIG. 10, an opening end portion opposite to the second fluid chamber 32b of the first fluid chamber 32a provided in the sleeve 32 constitutes a fifth port 38e. The fifth port 38e is connected with the master cylinder 1 side of the main path 3 by the flow path 63 in which a first check valve 62 is interposed. The first check valve 62 permits to flow the working fluid from the fifth port 38e to the master cylinder 1, but prevents the flowing of the working fluid from the master cylinder 1 to the fifth port 38e.

Also, the configuration of the antilock brake control apparatus having the solenoid controlled valve 61 shown in FIG. 10 is the same as that of the above described first embodiment.

In the antilock brake control apparatus shown in FIG. 10, when a driver releases the stepping operation of the brake pedal 57 during the holding mode of the antilock control, as shown with dotted liens in FIG. 10, the working fluid within the wheel cylinder 2 returns to the master cylinder 1 through the third port 38c, the second fluid chamber 32b, the third fluid passage 41c, the second portion 39b of the inlet path 39, the stationary orifice 40, the first portion 39a of the inlet path 39, the first fluid chamber 32a, the fifth port 38e and the flow path 63. When the working fluid within the wheel cylinder 2 returns to the side of the master cylinder 1 through the stationary orifice 40, fluid pressure within the second portion 39b of the inlet path 39 becomes higher than that within the first portion 39a of the inlet path 39. As the result, a force tending to move the spool 33 upwardly (pressure difference force F3) is applied to the spool 33 by the pressure difference before and after the stationary orifice 40.

Figure 11:
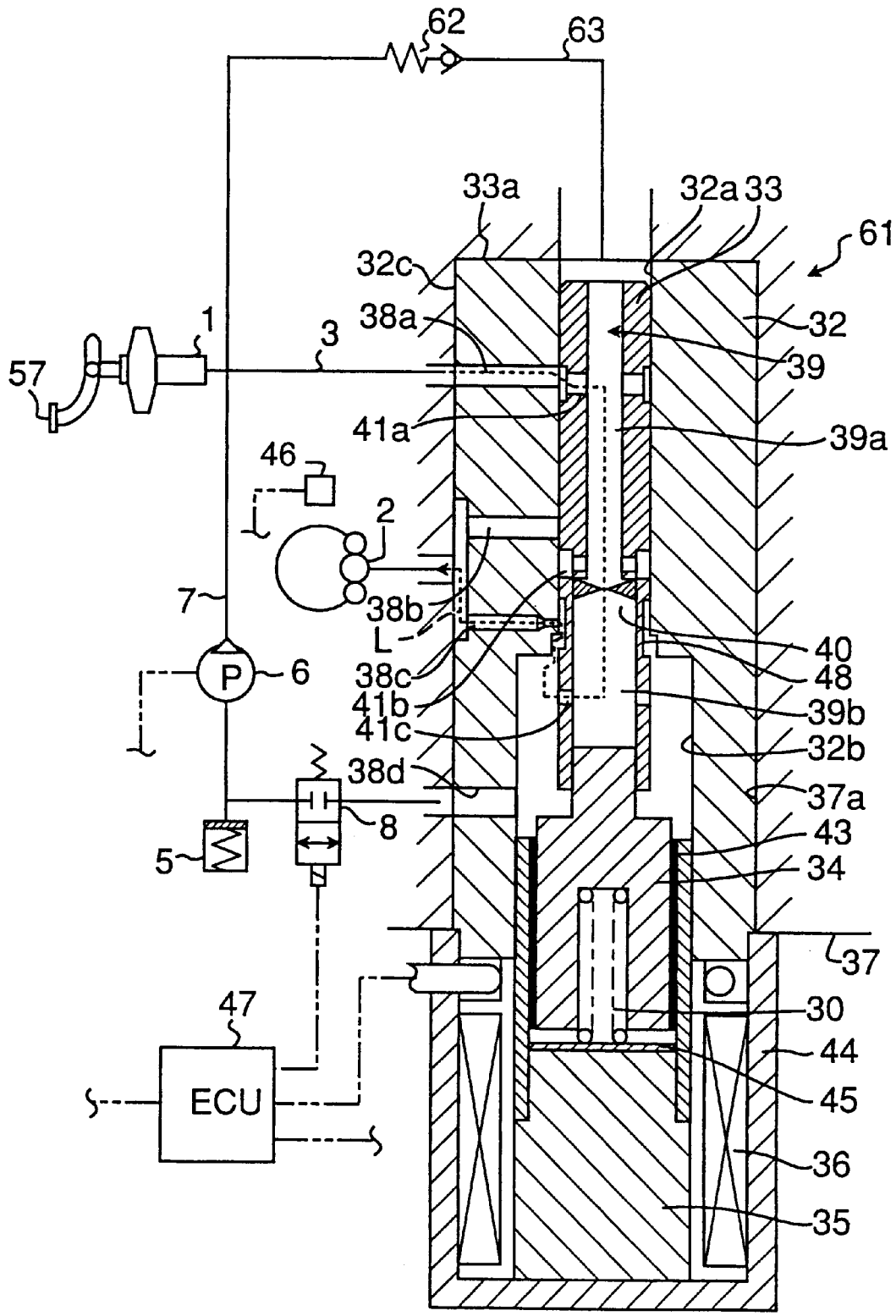
FIG. 11 is a schematic configuration view showing the double brake operation of the antilock brake control apparatus provided with the solenoid controlled valve according to the second embodiment of the present invention.

During the holding mode, there is a relationship of (F2>F1) between the spring force F1 and the solenoid force F2 as described above. When the total of the spring fore F1 and the pressure difference force F3 has exceeded the solenoid force F2, namely, a relationship of (F1+F3>F2) has been established, the spool 33 moves upwardly. As the result, the first port 38a communicates with the first fluid passage 41a of the spool 33 as shown in FIG. 11. In this case, as shown with the dotted line in FIG. 11, constant and small amount of working fluid is supplied form the master cylinder 1 to the wheel cylinder 2 through the first port 38a, the first fluid passage 41a, the first portion 39a of the inlet path 39, the stationary orifice 40, the second portion 39b of the inlet path 39, the third fluid passage 41c, the second fluid passage 32b, the communicating concave portion 48 and the third port 38c as same as the pressurizing mode. As the result, the pressure difference between the second portion 39b of the inlet path 39 and the first portion 39a is decreased. When the total of the spring force F1 and the pressure difference fore F3 is lowered than the solenoid force F2 to (F1+F3>F2), the spool 33 moves downward and returns to a position shown in FIG. 10.

As described above, the antilock control apparatus of the second embodiment is superior in safety. The wheel cylinder 2 does not become the pressure disabled status even when the double braking operation has been executed during the holding mode. The operations of the antilock control apparatus of the second embodiment in the normal pressurizing mode, in the depressurizing mode and in the slow pressurizing mode are similar to those of the above described first embodiment.

Third Embodiment

Figure 12:
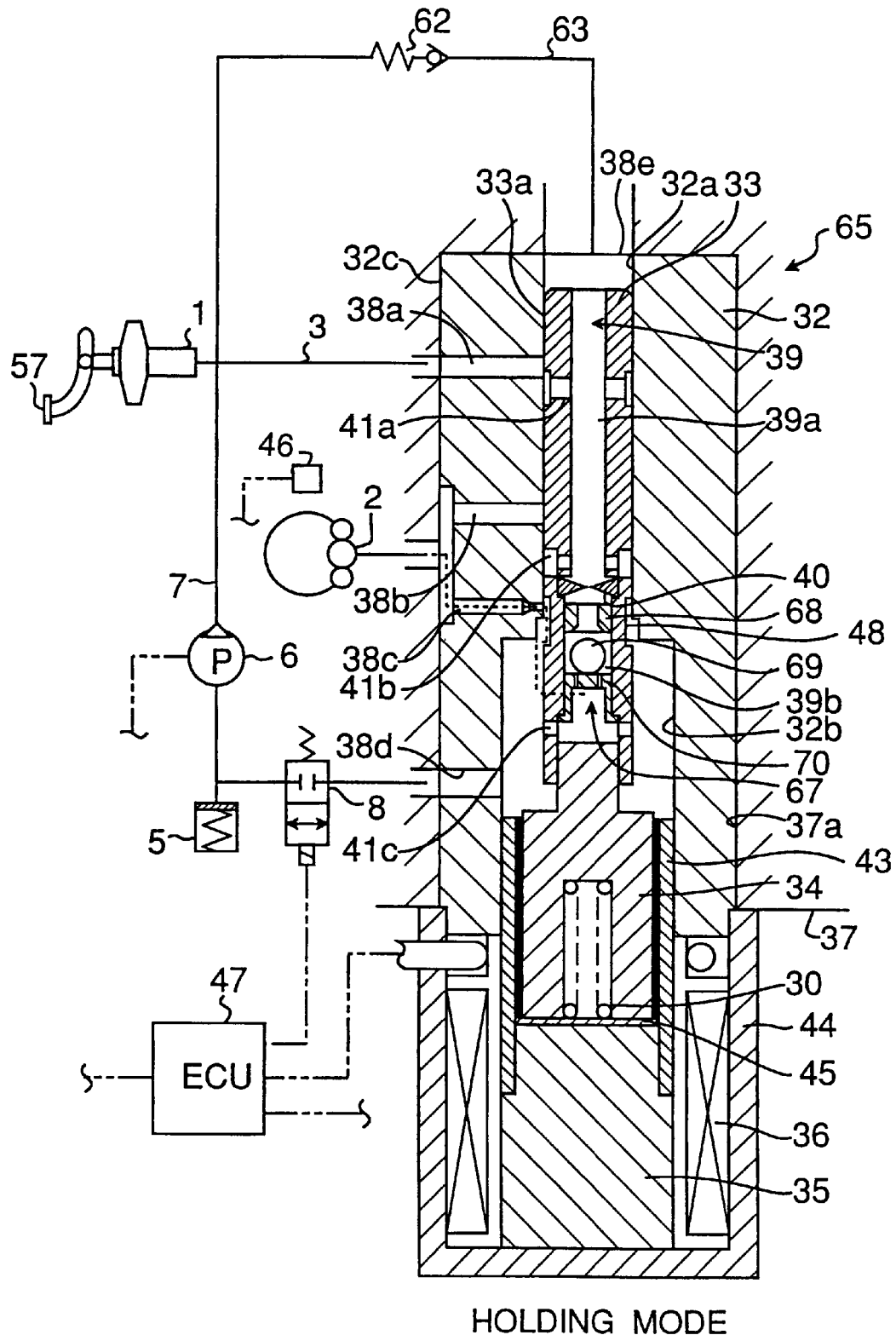
FIG. 12 is a schematic configuration view showing an antilock brake control apparatus provided with an solenoid controlled valve according to a third embodiment of this invention.
Figure 13A:
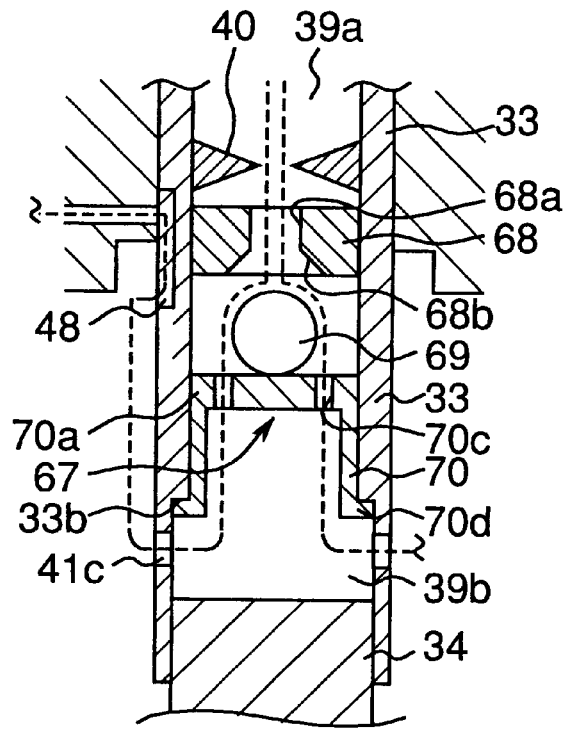
FIG. 13(A) and FIG. 13(B) are essential portion enlargement views of FIG. 11 showing a second check valves.
Figure 13B:
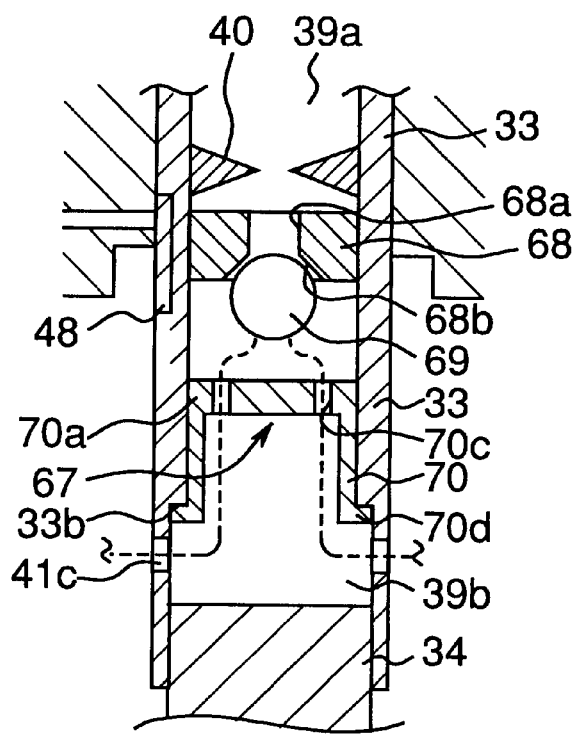
Figure 14:
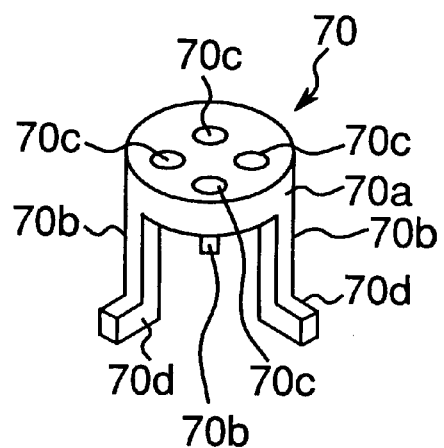
FIG. 14 is a perspective view showing a retaining member.

FIG. 12 through FIG. 14 show a third embodiment of the present invention.

In the third embodiment, a second check valve 67 is provided in the second portion 39b of the inlet path 39 of the spool 33. The second check valve 67 permits the working fluid to flow from the first portion 39a of the inlet path 39 into the second portion 39b through the stationary orifice 40 and prevents the flowing of the working fluid from the second portion 39b of the inlet path 39 to the first portion 39a through the stationary orifice 40. The second check valve 67 has a valve seat 68, a valve body 69 and a retaining member 70.

The valve seat 68 has short cylindrical shape. Also, the valve seat 68 has a taper shaped valve seat face 68b at the lower end in the drawing of the fluid passage 68a which extends in the thickness direction. The valve body 69 is constituted by a spherical body. As shown in FIG. 14, a retaining member 70 has a short cylindrical shaped main body 70a and leg portions 70b projecting from the main body 70a. The main body 70a has four fluid passages 70c extending through in the thickness direction. An engaging portion 70d is provided in the tip end of the leg portion 70b. The engaging portion 70d bends in a L-shape. As shown in FIGS. 13(A) and(B), the engaging portion 70d is engaged with a step portion 33b provided on the inner peripheral wall of the spool 33.

Another configuration of the solenoid controlled valve 65 of the third embodiment is the same as that of the solenoid controlled valve 61 of the second embodiment.

In the slow pressurizing mode of the antilock controlling, as shown in dotted lines in FIG. 13(A), the working fluid which flows from the first portion 39a of the inlet path 39 into the second portion 39b through the stationary orifice 40 depresses the valve body 69 against the retaining member 70 to release it from the valve seat 68. The working fluid which has flowed into the second portion 39b from the first portion 39a of the inlet path 39 through the stationary orifice 40 flows into the second fluid chamber 32 through the fluid passage 68a of the valve seat 68, the fluid passage 70c of the retaining member 70 and the fourth fluid passage 41c, and further, is supplied to the wheel cylinder 2 through the communicating concave portion 48d and the third port 38c.

When a driver releases the stepping operation of the brake pedal 57 during the holding mode of the antilock controlling shown in FIG. 12, the working fluid within the first portion 39a of the inlet path 39 of the spool 33 returns from the fifth port 38e to the master cylinder 1 through the connecting flow path 63. When fluid pressure within the first portion 39b is decreased, the working fluid within the second portion 39b of the inlet path 39 tries to flow to the first portion 39a through the stationary orifice 40. However, as shown in FIG. 13(B), the valve body 69 sits on the valve seat face 68b of the valve seat 68 to close the fluid passage 68a. Thus, the working fluid is not supplied from the second portion 39b of the inlet path 39 to the first portion 39a from the second portion 39b.

In the third embodiment, when the stepping of the brake pedal 57 has been released during the holding mode, the fluid pressure within the first portion 39a of the inlet path 39 is decreased, but the fluid pressure within the second portion 39b is not decreased. As the result, pressure difference caused before and after of the stationary orifice 40 rises quickly and becomes large as compared with the case of the second embodiment. Thus, the pressure difference force F3 is large, and the difference between the solenoid force F2 and the total force (F1+F3) of the spring force F1 and the pressure difference force F3 is larger than that of the second embodiment. Accordingly, the spool 33 moves surely and quickly toward upperside, and the first portion 38a is communicated with the first fluid passage 41a. When the brake pedal 52 is stepped again after the stepping operation of the brake pedal 52 has been released, the working fluid is supplied from the master cylinder 1 to the wheel cylinder 2 through the first port 38a, the first fluid passage 41a, the first portion 39a of the inlet path 39, the stationary orifice 40, the second portion 39b of the inlet path 39, the third fluid passage 38b, the second fluid chamber 32b, the communicating concave portion 48, the third portion 38c and the wheel cylinder 2 as same as the second embodiment.

In the third embodiment, the second check valve 67 can prevent surely the pressure within the wheel cylinder 2 from being impossible to be increased during the double brake operation.

Fourth Embodiment

Figure 15:
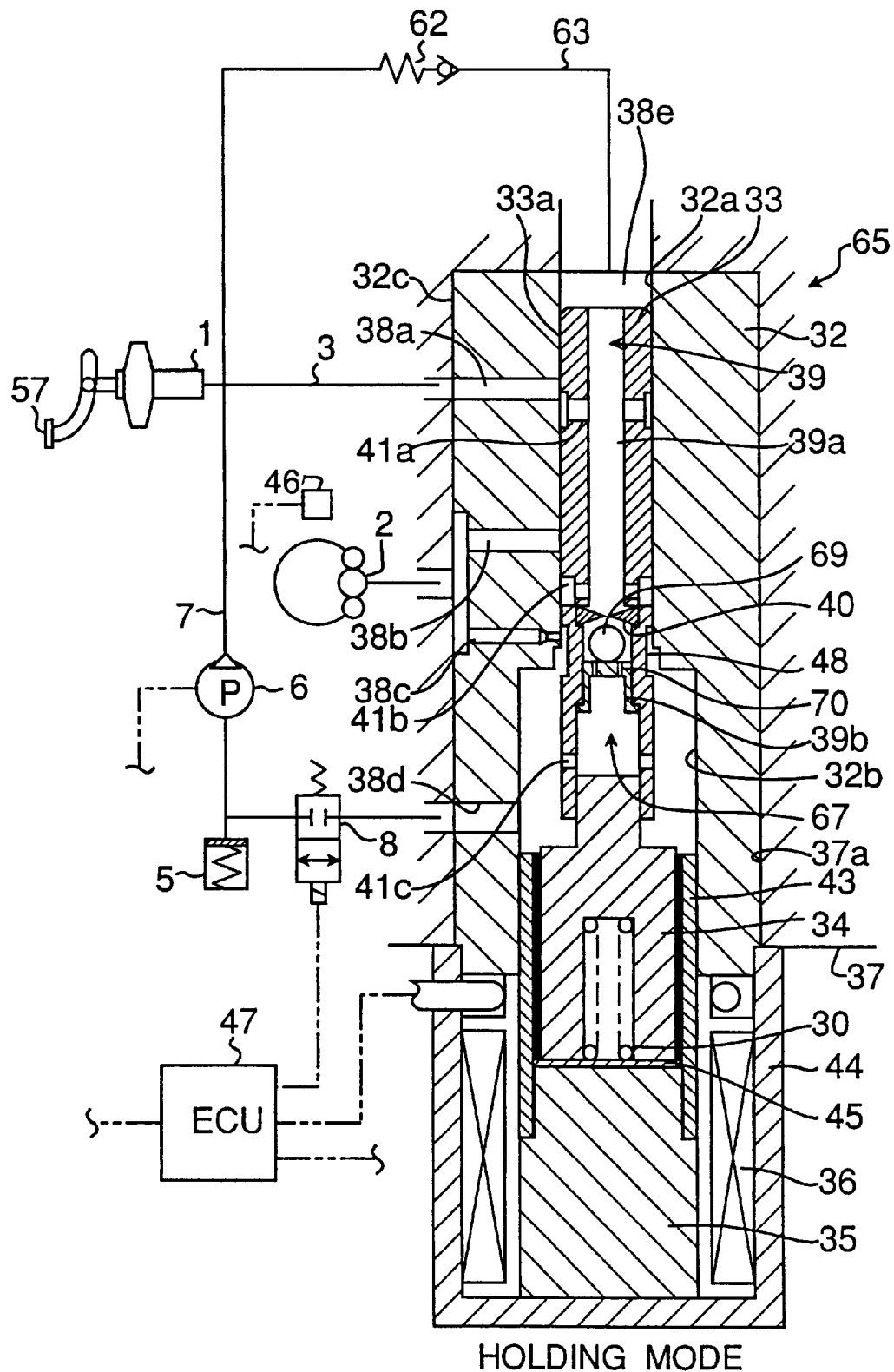
FIG. 15 is a schematic configuration view showing an antilock brake control apparatus provided with a solenoid controlled valve according to a fourth embodiment of the present invention.
Figure 16A:
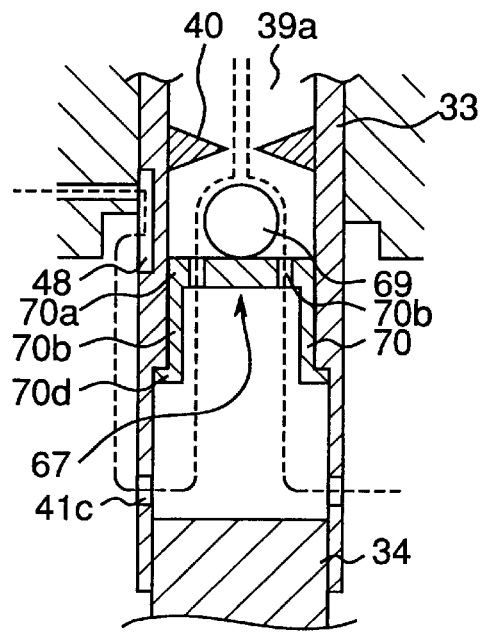
FIG. 16(A) and FIG. 16(B) are essential portion enlargement views of FIG. 15 showing a second check valve.
Figure 16B:
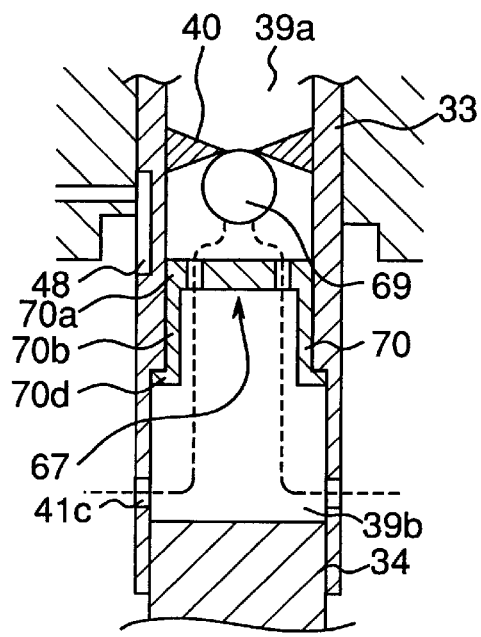

In a fourth embodiment of this invention shown in FIG. 15 and FIGS. 16(A) and(B), the second check valve 67 provided in the second portion 39b of the inlet path 39 formed in the spool 33 of the solenoid controlled valve 65 is composed of only a valve body 69 and a retaining member 70. In the fourth embodiment, a valve seat is not provided. That is where the difference between the forth embodiment and the third embodiment lies.

As shown in FIG. 16(A), during the slow pressurizing mode, the valve body 69 is separated from the stationary orifice 40 and is retained in the main body 70a of the retaining member 70 by the working fluid which flows from the first portion 39a of the inlet path 39 of the spool 33 into the second portion 39b through the stationary orifice 40.

When the pressure operation of the brake pedal 52 has been released during the holding mode as shown in FIG. 15, the working fluid within the first portion 39a formed in the inlet path 39 of the spool 33 returns to the master cylinder 1 through the fifth port 38e and the flow path 63. As the result, the fluid pressure within the first portion 39a is decreased. Meanwhile, since the valve body 69 sits in the stationary orifice 40, the communication between the first portion 39a of the inlet path 39 and the second portion 39b is cut off. Accordingly, the fluid pressure within the second portion 39b is not decreased. Thus, the pressure difference force F3 is applied upon the spool 33 as same as in the second embodiment, and the spool 33 moves upwardly to a position which is same position of the slow pressurizing mode against the solenoid force F2.

The fourth embodiment is simpler in configuration as compared with the third embodiment in that the valve seat is not necessary to be provided, thereby reducing the cost.

This invention can be made variable without limitation to the above embodiment.

Figure 17A:
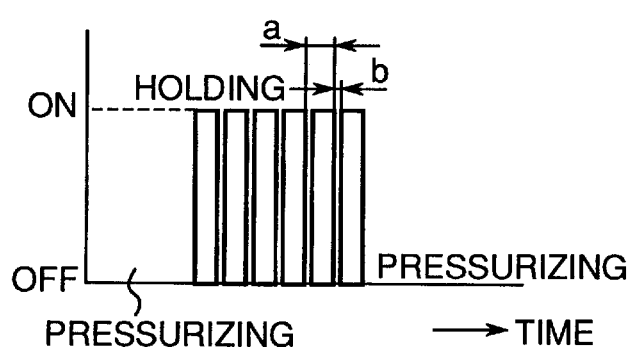
FIG. 17(A) and FIG. 17(B) are schematic configuration views showing a voltage to be applied upon the coil of the solenoid controlled valve.
Figure 17B:
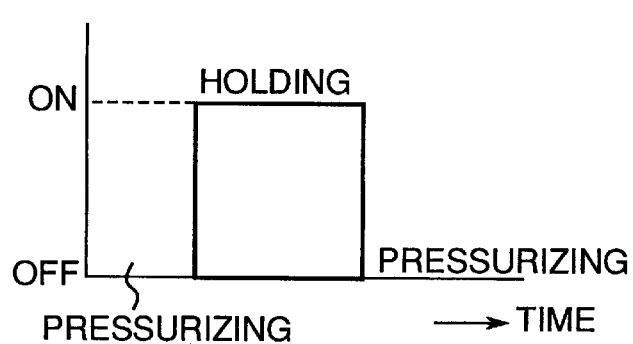

In the second embodiment shown in FIG. 10, as shown in FIG. 17(B), during the holding mode, electric current is supplied continuously (on status) to the coils 36 of the solenoid controlled valve 61. But, as shown in FIG. 17(A), an off status where the current supply to the coil 36 is stopped with the predetermined time interval "a" (about 100 msec) and the predetermined time "b" (about 16 msec) can be provided. In the case of setting the wave form of the voltage to be applied upon the spool 33 into such a wave form, the pressure disabled status during the double brake operation can be prevented from being caused more surely as compared with a case where merely electric current is supplied to the coils 36 continuously during the holding mode as shown in FIG. 17(B).

Time taken from the releasing the stepping operation to the stepping operation of the brake pedal 57 again by the driver in the double brake operation is 200 msec or more, which is sufficiently longer than the time interval "a". When the voltage having the wave form shown in FIG. 17(A) is applied to the coils 36 in the holding mode, the off status is created to stop the current supply to the coils 36 at least one time during the stepping operation of the brake pedal 57 is in released. When the stepping operation of brake pedal 57 is released so as to cut off the current supply to the coils 36, the solenoid force F2 disappears. As the result, pressure difference force F3 and the spring force F1 directed upwardly in the drawing is only applied to the spool 33. The spool 33 rises surely to a position where the first port 38a is communicated with the first fluid passage 41a as shown in FIG. 11. Thus, when the brake pedal 57 is stepped again as shown in the dotted lines L in FIG. 11, the working fluid is supplied from the master cylinder 1 to the wheel cylinder 2 to increase the fluid pressure of the wheel cylinder 2.

The time interval "a" is necessary to set short sufficiently with respect to the time necessary for the double brake operation in order that electric current supply to the coil 36 can be suspended at least one time during the step releasing of the brake pedal 57 of one double brake operation. The predetermined time "b" is necessary to be set to a length so that the spool 33 is not restored completely to a position of the normal pressurizing mode. In the case of the antilock control apparatus which is provided with a solenoid controlled valve 31, the flow path 55 and the check valve 56 as shown in FIG. 9, or in the case of the antilock control apparatus of the third or forth embodiments, the pressure disabled status can be prevented more surely during the double braking operation by applying voltage having wave form voltage as shown in FIG. 17 (A) to the coils 36 in the holding mode.

The second check valve of the third and fourth embodiments can be provided in the first portion 39a of the inlet path 39 forme in the spool 33.

Although the present invention has been fully described in connection with the preferred embodiments thereof with reference to the accompanying drawings, it is to be noted that various changes and modifications are apparent to those skilled in the art. Such changes and modifications are to understood as included within the scope of the invention as defined by the appended claims unless they depart therefrom.

What is claimed is:

1. An antilock control apparatus including a solenoid controlled valve, comprising:

a sleeve having a first fluid chamber, a second fluid chamber larger in diameter than the first fluid chamber and axially continuously provided to the first fluid chamber, a first port, a second port and a third port communicated with the first fluid chamber, and a fourth port communicated with the second fluid chamber, these ports being provided on an external peripheral face of the sleeve, the second port and the third port being merged;

a spool being inserted slidably at its one end side, in a fluid tight condition, into the first fluid chamber of the sleeve, being inserted loosely at its other end into the second fluid chamber of the sleeve, the spool having an inlet path, a stationary orifice for partitioning the inlet path into a first portion and a second portion, a first fluid passage and a second fluid passage for communicating the first portion of the inlet path with an external peripheral face of the spool, and a third fluid passage for communicating the second portion of the inlet path with the second fluid chamber of the sleeve;

an elastic mechanism for urging the spool in one direction;

a movable core to be engaged with the spool; and coils for generating a magnetic field to attract the movable core in a direction opposite to the urging direction of the elastic mechanism by supplying an electric current;

whereby, at the time of the spool being in an engaging position by the urging force of the elastic mechanism, a large flow path is formed from the first port to the second port through the first fluid passage, the first portion of the inlet path and the second fluid passage;

at the time of the fourth port being opened, the spool moves opposite to the urging direction of the elastic mechanism, thereby a large flow path for communicating the third port with the fourth port through the second fluid chamber is formed;

at the time of the fourth port being closed after once having been opened, a small flow path, for communicating in a constant flow amount the first port with the third port through a variable orifice composed by the first port and the first fluid passage, the first portion of the inlet path, the stationary orifice and the second portion of the inlet path is formed; and at the time of the movable core being attracted against the spring force of the elastic mechanism by feeding to the coil, the spool moves opposite to the urging direction of the elastic mechanism, thereby the external peripheral face of the spool closes the first port;

wherein the first port of the solenoid controlled valve is connected with a master cylinder, the second port and the third port are connected with a wheel cylinder, a return path for connecting the fourth port with the master cylinder is provided, and a normally-closed on/off type solenoid controlled valve and a reservoir are interposed in the return path, the antilock control apparatus having a controller capable of carrying out:

a normal pressurizing mode where the coil of the solenoid controlled valve is made non-energizing and the on/off type solenoid controlled valve is closed, thereby, the spool is positioned in the engaging portion by the urging force of the elastic mechanism, the large flow path which communicates the master cylinder with the wheel cylinder through the first port, the first fluid passage, the first portion of the inlet path, the second fluid passage and the second port is formed;

a depressurizing mode where the coil of the solenoid controlled valve is made non-energizing and the on/off type solenoid controlled valve is open, thereby, the spool is moved opposite to the urging direction of the elastic mechanism by pressure-decreasing of the fourth port, a large flow path for communicating the wheel cylinder with the reservoir through the third port, the second fluid chamber, the fourth port and the on/off type solenoid controlled valve is formed;

a holding mode where after the depressurizing mode, a feeding operation is conducted to the coil of the solenoid controlled valve to attract the movable core against the spring force and the normally-closed on/off type solenoid controlled valve is closed, thereby, the spool moves in a direction opposite to the urging direction of the elastic mechanism, the first port is closed by the external peripheral face of the spool to cut off the communication between the wheel cylinder and the master cylinder; and a slow pressurizing mode where after the depressurizing mode, the coils of the solenoid controlled valve are made non-energizing and the normally-closed on/off type solenoid controlled valves are closed, a small flow path for communicating in a constant flow amount the master cylinder with the wheel cylinder through the first port, the variable orifice composed of the first port and the first fluid communicating passage, the first portion of the inlet path, the stationary orifice, the second portion of the inlet path, and the third port is formed.

2. The antilock control apparatus according to claim 1, wherein the solenoid controlled valve further comprises a fifth port for communicating the first fluid chamber with the external peripheral face of the spool on the engaging position side by the urging force of the elastic means;

a flow path for communicating the fifth port with the master cylinder side of the main path; and a first check valve which permits the working fluid to flow from the fifth port in the flow path to the master cylinder, meanwhile prevents the working fluid from flowing from the master cylinder to the fifth port.

3. The antilock control apparatus according to claim 2, wherein the solenoid controlled valve further comprises a second check valve which permits the working fluid to flow from the first portion of the inlet path to the second portion of it, meanwhile prevents the working fluid from flowing from the second portion to the first portion.

4. The antilock control apparatus according to claim 3, wherein the second check valve is provided in the second portion of the inlet path.

5. The antilock control apparatus according to claim 4, wherein the second check valve has a spherical body and a holder which retains the spherical body in a position opposite to the stationary orifice, and allows the working fluid to pass.

6. An antilock control apparatus including a solenoid controlled valve, comprising:

a sleeve having a first fluid chamber, a second fluid chamber larger in diameter than the first fluid chamber and axially continuously provided to the first fluid chamber, a first port, a second port and a third port communicated with the first fluid chamber, and a fourth port communicated with the second fluid chamber, these ports being provided on an external peripheral face of the sleeve, the second port and the third port being merged;

a spool being inserted slidably at its one end side, in a fluid tight condition, into the first fluid chamber of the sleeve, being inserted loosely at its other end into the second fluid chamber of the sleeve, the spool having an inlet path, a stationary orifice for partitioning the inlet path into a first portion and a second portion, a first fluid passage and a second fluid passage for communicating the first portion of the inlet path with an external peripheral face of the spool, and a third fluid passage for communicating the second portion of the inlet path with the second fluid chamber of the sleeve;

an elastic mechanism for urging the spool in one direction;

a movable core to be engaged with the spool; and coils for generating a magnetic field to attract the movable core in a direction opposite to the urging direction of the elastic mechanism by supplying an electric current;

whereby, at the time of the spool being in an engaging position by the urging force of the elastic mechanism, a large flow path is formed from the first port to the second port through the first fluid passage, the first portion of the inlet path and the second fluid passage;

at the time of the fourth port being opened, the spool moves opposite to the urging direction of the elastic mechanism, thereby a large flow path for communicating the third port with the fourth port through the second fluid chamber is formed;

at the time of the fourth port being closed after once having been opened, a small flow path, for communicating in a constant flow amount the first port with the third port through a variable orifice composed by the first port and the first fluid passage, the first portion of the inlet path, the stationary orifice and the second portion of the inlet path is formed; and at the time of the movable core being attracted against the spring force of the elastic mechanism by feeding to the coil, the spool moves opposite to the urging direction of the elastic mechanism, thereby the external peripheral face of the spool closes the first port;

wherein the first port of the solenoid controlled valve is connected with a master cylinder, the second port and the third port are connected with a wheel cylinder, a return path for connecting the fourth port with the master cylinder is provided, and a normally-closed on/off type solenoid controlled valve and a reservoir are interposed in the return path, the antilock control apparatus having a controller capable of carrying out;

a normal pressurizing mode where the coil of the solenoid controlled valve is made non-energizing and the on/off type solenoid controlled valve is closed, thereby, the spool is positioned in the engaging portion by the urging force of the elastic mechanism, the large flow path which communicates the master cylinder with the wheel cylinder through the first port, the first fluid passage, the first portion of the inlet path, the second fluid passage and the second port is formed;

a depressurizing mode where the coil of the solenoid controlled valve is made non-energizing and the on/off type solenoid controlled valve is open, thereby, the spool is moved opposite to the urging direction of the elastic mechanism by pressure-decreasing of the fourth port, a large flow path for communicating the wheel cylinder with the reservoir through the third port, the second fluid chamber, the fourth port and the on/off type solenoid controlled valve is formed;

a holding mode where after the depressurizing mode, a feeding operation is conducted to the coil of the solenoid controlled valve to attract the movable core against the spring force and the normally-closed on/off type solenoid controlled valve is closed, thereby, the spool moves in a direction opposite to the urging direction of the elastic mechanism, the first port is closed by the external peripheral face of the spool to cut off the communication between the wheel cylinder and the master cylinder; and a slow pressurizing mode where after the depressurizing mode, the coils of the solenoid controlled valve are made non-energizing and the normally-closed on/off type solenoid controlled valves are closed, a small flow path for communicating in a constant flow amount the master cylinder with the wheel cylinder through the first port, the variable orifice composed of the first port and the first fluid communicating passage, the first portion of the inlet path, the stationary orifice, the second portion of the inlet path, and the third port is formed;

wherein the controller stops the feeding to the coil of the solenoid controlled valve intermittently in the predetermined time interval during the holding mode.

* * * * *